United States Patent
Kim et al.

(10) Patent No.: US 9,054,852 B2
(45) Date of Patent: Jun. 9, 2015

(54) METHOD AND DEVICE FOR TRANSMITTING/RECEIVING CHANNEL STATE INFORMATION IN COORDINATED MULTIPOINT COMMUNICATION SYSTEM

(75) Inventors: Hyungtae Kim, Anyang-si (KR); Kijun Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 198 days.

(21) Appl. No.: 13/697,920

(22) PCT Filed: Jun. 8, 2011

(86) PCT No.: PCT/KR2011/004181
§ 371 (c)(1),
(2), (4) Date: Nov. 14, 2012

(87) PCT Pub. No.: WO2011/155763
PCT Pub. Date: Dec. 15, 2011

(65) Prior Publication Data
US 2013/0058307 A1    Mar. 7, 2013

Related U.S. Application Data

(60) Provisional application No. 61/352,402, filed on Jun. 8, 2010, provisional application No. 61/362,299, filed on Jul. 8, 2010.

(51) Int. Cl.
*H04L 5/00* (2006.01)
*H04B 7/02* (2006.01)
(Continued)

(52) U.S. Cl.
CPC .............. *H04L 5/0091* (2013.01); *H04B 7/024* (2013.01); *H04B 7/0626* (2013.01);
(Continued)

(58) Field of Classification Search
CPC .... H04B 7/024; H04B 7/0626; H04B 7/0639; H04B 7/065; H04L 5/0035; H04L 25/03955; H04L 5/0057; H04L 5/0091; H04L 25/03343; H04L 5/0023; H04L 2025/03426; H04L 2025/03808; H04L 5/0053
USPC ......... 370/329, 252, 241, 310, 328, 338, 351, 370/389, 395.1, 395.5, 395.53; 455/69, 455/63.1, 403, 422.1, 7, 24
See application file for complete search history.

(56) References Cited

U.S. PATENT DOCUMENTS

2005/0213682 A1  9/2005  Han et al.
2006/0009189 A1  1/2006  Kim et al.
(Continued)

FOREIGN PATENT DOCUMENTS

JP    2006-503492 A    1/2006

*Primary Examiner* — Obaidul Huq
(74) *Attorney, Agent, or Firm* — Birch, Stewart, Kolasch & Birch, LLP

(57) ABSTRACT

The present invention relates to a wireless communication system. More particularly, disclosed are a method and a device for transmitting channel state information in a coordinated multipoint communication system. The method for transmitting channel state information from a terminal to multiple base stations, according to one embodiment of the present invention, comprise the steps of: transmitting the CSI including long-term broadband PMI and short-term sub-band PMI to a first base station; transmitting the CSI including the long-term broadband PMI and not including the short-term sub-band PMI to a second base station; and transmitting the CSI including the short-term sub-band PMI to the second base station, when a request for the short-term sub-band PMI transmission to the second base station is received.

19 Claims, 13 Drawing Sheets

(51) Int. Cl.
*H04B 7/06* (2006.01)
*H04L 25/03* (2006.01)

(52) U.S. Cl.
CPC ............ *H04B 7/0639* (2013.01); *H04B 7/065* (2013.01); *H04L 5/0023* (2013.01); *H04L 5/0035* (2013.01); *H04L 5/0053* (2013.01); *H04L 5/0057* (2013.01); *H04L 25/03343* (2013.01); *H04L 2025/03426* (2013.01); *H04L 2025/03808* (2013.01); *H04L 25/03955* (2013.01)

(56) References Cited

U.S. PATENT DOCUMENTS

| | | |
|---|---|---|
| 2009/0190528 A1 | 7/2009 | Chung et al. |
| 2010/0035555 A1* | 2/2010 | Bala et al. .................... 455/63.1 |
| 2010/0048232 A1 | 2/2010 | Hwang et al. |
| 2010/0098012 A1* | 4/2010 | Bala et al. .................... 370/329 |
| 2010/0099364 A1* | 4/2010 | Yang et al. ..................... 455/69 |
| 2011/0149765 A1* | 6/2011 | Gorokhov et al. ............ 370/252 |

* cited by examiner

FIG.8
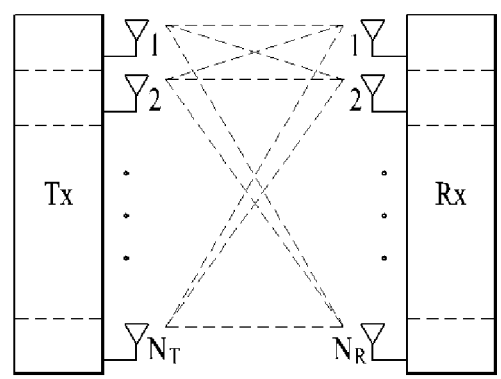
(a)
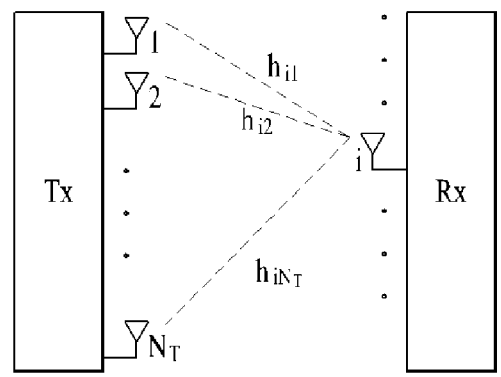
(b)

FIG. 9
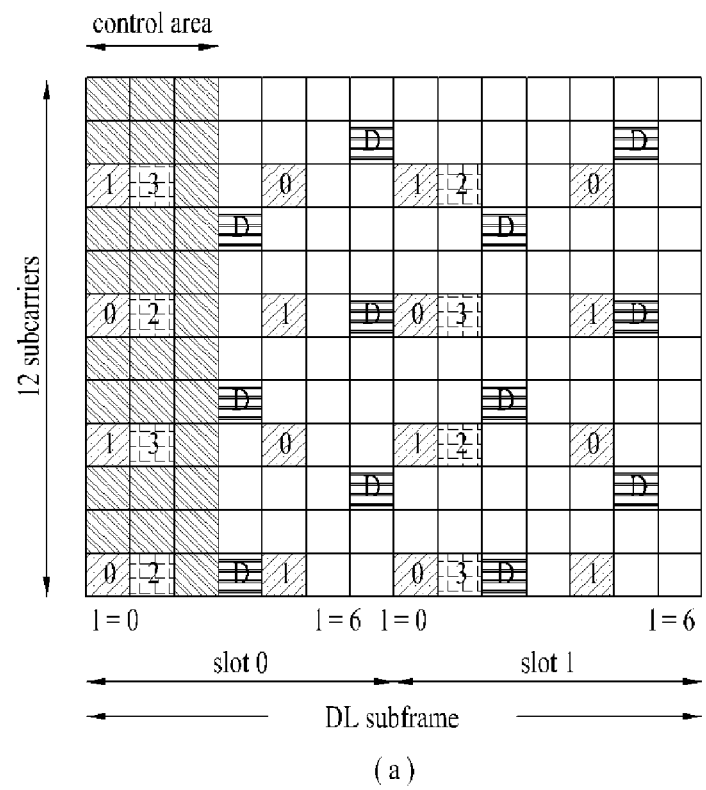
(a)
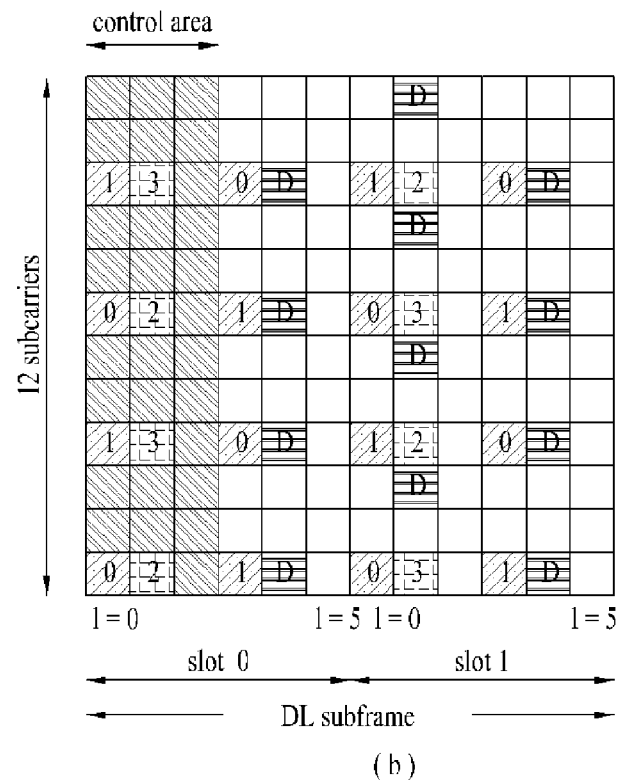
(b)

METHOD AND DEVICE FOR TRANSMITTING/RECEIVING CHANNEL STATE INFORMATION IN COORDINATED MULTIPOINT COMMUNICATION SYSTEM

CROSS REFERENCE TO RELATED APPLICATIONS

This application is the National Phase of PCT/KR2011/004181 filed on Jun. 8, 2011, which claims priority under 35 U.S.C. 119(e) to U.S. Provisional Application Nos. 61/352,402 filed on Jun. 8, 2010 and 61/362,299 filed on Jul. 8, 2010, all of which are hereby expressly incorporated by reference into the present application.

TECHNICAL FIELD

The following description relates to a wireless communication system and more particularly to method and apparatus for transmitting and receiving channel state information in a Coordinated Multi-Point (CoMP) system.

BACKGROUND ART

Multi-Input Multi-Output (MIMO) is a technology that uses multiple transmission antennas and multiple reception antennas to improve transmission and reception efficiency, emerging from the technology that uses a single transmit antenna and a single receive antenna. When a single antenna is used, the receiving side receives data through a single-antenna path. However, when multiple antennas are used, the receiving side receives data through multiple paths. Thus, MIMO can increase transfer rate and the amount of transmission and can also increase coverage.

Single-cell MIMO modes may be divided into a Single-User-MIMO (SU-MIMO) mode in which a single user equipment receives a downlink signal from a single cell and a Multi-User-MIMO (MU-MIMO) mode in which two or more user equipments receive a downlink signal from a single cell.

Studies are being vigorously conducted on a Coordinated Multi-Point (CoMP) system that applies advanced MIMO transmission in multi-cell environments to improve throughput of a user located at a cell edge. Application of the CoMP system can not only reduce Inter-Cell Interference (ICI) in a multi-cell environment but can also improve overall system performance.

DISCLOSURE

Technical Problem

To smoothly perform a CoMP operation, a user equipment which operates in a multi-cell environment needs to feed back Channel State Information (CSI) regarding a serving cell and CSI regarding a neighboring cell which participates in a CoMP operation. Here, when a conventional CSI feedback scheme for a single cell is directly applied, there is a problem in which feedback overhead increases as the number of cells whose CSI should be fed back increases.

An object of the present invention is to provide a method and apparatus for efficiently feeding CSI back in a system that supports a CoMP operation in order to solve the above problem.

Objects of the present invention are not limited to those described above and other objects will be clearly understood by a person having ordinary knowledge in the art from the following description.

Technical Solution

A method for transmitting CSI of multiple base stations from a user equipment according to an embodiment to achieve the above objects may include transmitting Channel State Information (CSI) including long-term-wideband Precoding Matrix Information (PMI) and short-term-subband PMI regarding a first base station, transmitting CSI which includes long-term-wideband PMI regarding a second base station and does not include short-term-subband PMI regarding the second base station, and transmitting CSI including the short-term-subband PMI regarding the second base station upon receiving a request for the short-term-subband PMI regarding the second base station.

A method for supporting Coordinated Multi-Point (CoMP) communication in a first base station according to another embodiment to achieve the above objects may include receiving Channel State Information (CSI) including long-term-wideband Precoding Matrix Information (PMI) and short-term-subband PMI regarding the first base station and CSI which includes long-term-wideband PMI regarding a second base station and does not include short-term-subband PMI regarding the second base station from a user equipment, transmitting CSI regarding the second base station to the second base station, receiving a request for the short-term-subband PMI regarding the second base station from the second base station and providing the request to the user equipment, and receiving CSI including the short-term-subband PMI regarding the second base station from the user equipment and providing the CSI to the second base station.

A method for supporting Coordinated Multi-Point (CoMP) communication in a second base station according to another embodiment to achieve the above objects may include receiving Channel State Information (CSI) which includes long-term-wideband Precoding Matrix Information (PMI) regarding the second base station and does not include short-term-subband PMI regarding the second base station, transmitting a request for the short-term-subband PMI regarding the second base station upon determining that CoMP communication is to be performed with a first base station based on the CSI regarding the second base station, and receiving CSI including the short-term-subband PMI regarding the second base station.

A user equipment for transmitting Channel State Information (CSI) of multiple base stations according to another embodiment to achieve the above objects may include a reception module for receiving a downlink signal from first and second base stations, a transmission module for transmitting an uplink signal to the first and second base stations, and a processor for controlling the user equipment including the reception module and the transmission module, wherein the processor may be configured to transmit CSI including long-term-wideband Precoding Matrix Information (PMI) and short-term-subband PMI regarding a first base station through the transmission module, to transmit CSI which includes long-term-wideband PMI regarding a second base station and does not include short-term-subband PMI regarding the second base station through the transmission module, and to transmit CSI including the short-term-subband PMI regarding the second base station through the transmission module upon receiving a request for the short-term-subband PMI regarding the second base station through the reception module.

A first base station supporting Coordinated Multi-Point (CoMP) communication according to another embodiment to achieve the above objects may include a reception module for receiving an uplink signal from a user equipment and receiving inter-base-station information from a second base station, a transmission module for transmitting a downlink uplink signal to the user equipment and transmitting inter-base-station information to the second base station, and a processor for controlling the first base station including the reception module and the transmission module, wherein the processor may be configured to receive Channel State Information (CSI) including long-term-wideband Precoding Matrix Information (PMI) and short-term-subband PMI regarding the first base station and CSI which includes long-term-wideband PMI regarding the second base station and does not include short-term-subband PMI regarding the second base station from the user equipment through the reception module, to transmit CSI regarding the second base station to the second base station through the transmission module, and to receive a request for the short-term-subband PMI regarding the second base station from the second base station through the reception module and provide the request to the user equipment through the transmission module, and to receive CSI including the short-term-subband PMI regarding the second base station from the user equipment through the reception module and provide the CSI to the second base station through the transmission module.

A second base station supporting Coordinated Multi-Point (CoMP) communication according to another embodiment to achieve the above objects may include a reception module for receiving an uplink signal from a user equipment and receiving inter-base-station information from a first base station, a transmission module for transmitting a downlink uplink signal to the user equipment and transmitting inter-base-station information to the first base station, and a processor for controlling the second base station including the reception module and the transmission module, wherein the processor may be configured to receive Channel State Information (CSI) which includes long-term-wideband Precoding Matrix Information (PMI) regarding the second base station and does not include short-term-subband PMI regarding the second base station through the reception module, to transmit a request for the short-term-subband PMI regarding the second base station upon determining that CoMP communication is to be performed with a first base station based on the CSI regarding the second base station through the transmission module, and to receive CSI including the short-term-subband PMI regarding the second base station through the reception module.

The following features may be commonly applied to the embodiments of the present invention.

The request for the short-term-subband PMI regarding the second base station may be transmitted/received together with an identifier of the user equipment.

A Channel Quality Information (CQI) difference indicating a change of CQI from current CQI to CQI due to a Coordinated Multi-Point (CoMP) operation of the first and second base stations may be transmitted/received together with the CSI including the short-term-subband PMI regarding the second base station.

The first base station may be a serving base station and the second base station may be a neighboring base station which can participate in a CoMP operation.

The CSI regarding the first base station may be transmitted from the user equipment to the first base station and the CSI regarding the second base station may be transmitted from the user equipment to the first base station or the second base station.

The CSI regarding the second base station may include a Rank Indicator (RI) and the RI may be fixed to 1 or may be equal to a rank value regarding the first base station.

It is to be understood that both the foregoing general description and the following detailed description of the present invention are exemplary and explanatory and are intended to provide further explanation of the invention as claimed.

Advantageous Effects

According to the present invention, it is possible to provide a method and apparatus for efficiently feeding CSI back in a system that supports a CoMP operation.

Advantages of the present invention are not limited to those described above and other advantages will be clearly understood by a person having ordinary knowledge in the art from the following description.

DESCRIPTION OF DRAWINGS

The drawings, which are attached to this specification to provide a further understanding of the invention, illustrate various embodiments of the invention and together with the description serve to explain the principle of the invention. In the drawings:

FIG. 8 is a diagram showing the configuration of a wireless communication system having multiple antennas.

FIG. 9 is a diagram showing a reference signal pattern defined in a conventional LTE system.

BEST MODE

Figure 1:
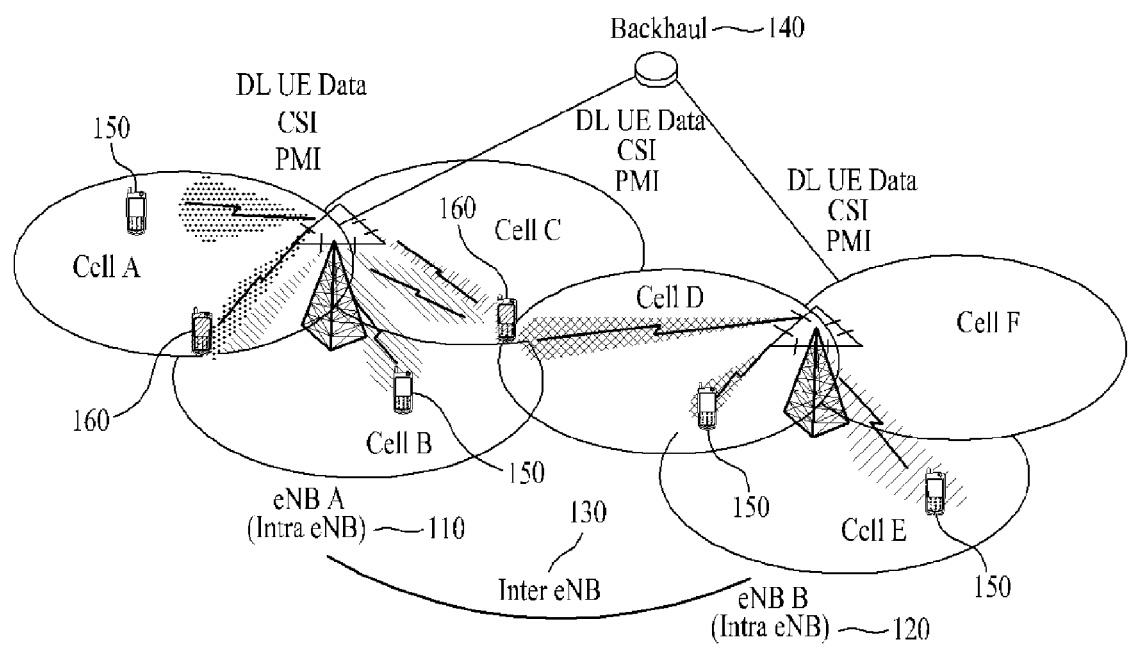
FIG. 1 conceptually illustrates a CoMP operation of an intra eNB and an inter eNB.

The embodiments described below are provided by combining components and features of the present invention in specific forms. The components or features of the present invention can be considered optional unless explicitly stated otherwise. The components or features may be implemented without being combined with other components or features. The embodiments of the present invention may also be provided by combining some of the components and/or features. The order of the operations described below in the embodiments of the present invention may be changed. Some components or features of one embodiment may be included in another embodiment or may be replaced with corresponding components or features of another embodiment.

The embodiments of the present invention have been described focusing mainly on the data communication relationship between a terminal and a Base Station (BS). The BS is a terminal node in a network which performs communication directly with the terminal. Specific operations which have been described as being performed by the BS may also be performed by an upper node as needed.

That is, it will be apparent to those skilled in the art that the BS or any other network node may perform various operations for communication with terminals in a network including a number of network nodes including BSs. Here, the term "base station (BS)" may be replaced with another term such as "fixed station", "Node B", "eNode B (eNB)", or "access point". In the following description, the "base station" may be used to refer to a concept including a cell or sector. For example, in the present invention, a serving base station may be referred to as a serving cell and may also be referred to as a cooperative cell. The term "terminal" may also be replaced with another term such as "User Equipment (UE)", "Mobile Station (MS)", "Mobile Subscriber Station (MSS)", or "Subscriber Station (SS)".

Specific terms used in the following description are provided for better understanding of the present invention and can be replaced with other terms without departing from the spirit of the present invention.

In some instances, known structures and devices are omitted or shown in block diagram form, focusing on important features of the structures and devices, so as not to obscure the concept of the present invention. The same reference numbers will be used throughout this specification to refer to the same or like parts.

The embodiments of the present invention can be supported by standard documents of at least one of the IEEE 802 system, the 3GPP system, the 3GPP LTE system, the LTE-Advanced (LTE-A) system, and the 3GPP2 system which are wireless access systems. That is, steps or portions that are not described in the embodiments of the present invention for the sake of clearly describing the spirit of the present invention can be supported by the standard documents. For all terms used in this disclosure, reference can be made to the standard documents.

Technologies described below can be used in various wireless access systems such as a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system. CDMA may be implemented with a radio technology such as Universal Terrestrial Radio Access (UTRA) or CDMA2000. TDMA may be implemented with a radio technology such as Global System for Mobile communication (GSM), General Packet Radio Service (GPRS), or Enhanced Data rates for GSM Evolution (EDGE). OFDMA may be implemented with a radio technology such as IEEE 802.11 (Wi-Fi), IEEE 802.16 (WiMAX), IEEE 802.20, or Evolved-UTRA (E-UTRA). UTRA is a part of Universal Mobile Telecommunication System (UMTS). 3rd Generation Partnership Project (3GPP) Long Term Evolution (LTE) is a part of Evolved-UMTS (E-UMTS) that uses E-UTRA. 3GPP LTE employs OFDMA for downlink and employs SC-FDMA for uplink. LTE-Advanced (LTE-A) is an evolution of 3GPP LTE. WiMAX can be explained by IEEE 802.16e standard (WirelessMAN-OFDMA Reference System) and advanced IEEE 802.16m standard (WirelessMAN-OFDMA advanced system). Although the present invention will be described below mainly with reference to 3GPP LTE and 3GPP LTE-A standards for the sake of clarification, the technical spirit of the present invention is not limited to the 3GPP LTE and LTE-A standards.

A Coordinated Multi-Point (CoMP) system is described below with reference to FIG. 1. FIG. 1 conceptually illustrates a CoMP operation of an intra eNB and an inter eNB.

According to the advanced system performance requirements of the 3GPP LTE-A system, CoMP transmission/reception technology (which may be referred to as co-MIMO, collaborative MIMO or network MIMO) has been suggested. The CoMP technology can increase the performance of the UE located at a cell edge and increase average sector throughput.

In general, in a multi-cell environment whose frequency reuse factor is 1, the performance of the UE located at the cell edge and average sector throughput may be reduced due to Inter-Cell Interference (ICI). In order to reduce the ICI, the existing LTE system applies a method in which a UE located at a cell edge acquires appropriate throughput and performance using a simple passive scheme such as Fractional Frequency Reuse (FFR) through UE-specific power control in an environment restricted by interference. However, rather than decreasing the use of frequency resources per cell, it may be preferable that the ICI be reduced or the UE reuse the ICI as a desired signal. A CoMP transmission scheme may be applied in order to accomplish such an object.

Referring to FIG. 1, intra eNBs 110 and 120 and an inter eNB 130 are present in a multi-cell environment. In an LTE system, an intra eNB includes a number of cells (or sectors). Cells belonging to an eNB to which a specific UE belongs are in a relationship of an intra eNB 110 or 120 with the specific UE. That is, cells that share an eNB to which a UE belongs correspond to an intra eNB 110 or 120 and cells belonging to other eNBs correspond to an inter eNB 130. Thus, cells (i.e., an intra eNB) which are based on the same eNB as a specific UE can exchange information (for example Channel State Information (CSI)) without an interface between schedulers of the cells, whereas cells (i.e., an inter eNB) which are based on different eNBs can exchange information with each other through a backhaul 140. As shown in FIG. 1, a single-cell MIMO user 150 present in a single cell may communicate with a single serving eNB in one cell (cell A, cell B, cell D, or cell E) and a multi-cell MIMO user 160 located at a cell edge may communicate with a plurality of serving eNBs in multiple cells (cells A and B or cells B, C, and D).

The CoMP scheme which is applicable to downlink may be largely classified into a Joint Processing (JP) scheme and a Coordinated Scheduling/Coordinated Beamforming (CS/CB) scheme.

In the JP scheme, each point (eNodeB) of a CoMP unit may use data. The CoMP unit is a set of eNodeBs used in the CoMP scheme. The JP scheme may be classified into a joint transmission scheme and a dynamic cell selection scheme.

The joint transmission scheme is a method in which a PDSCH is simultaneously transmitted from a plurality of points (all or part of the CoMP unit). That is, data destined for a single UE may be simultaneously transmitted from a plurality of transmission points. According to the joint transmission scheme, it is possible to coherently or non-coherently improve the quality of received signals and to actively eliminate interference with another UE.

The dynamic cell selection scheme is a method in which a PDSCH is transmitted from one point (of the CoMP unit). That is, data destined for a single UE is transmitted from one point at a specific time and the other points in the CoMP unit do not transmit data to the UE at that time. The point for transmitting the data to the UE may be dynamically selected.

According to the CS/CB scheme, CoMP units may cooperatively perform beamforming of data transmission to a single UE. Here, although only the serving cell transmits data, user scheduling/beamforming may be determined by coordination of the cells of the CoMP unit.

In uplink, the term "coordinated multi-point reception" refers to reception of a signal transmitted by coordination of a plurality of geographically separated points. The CoMP scheme which is applicable to uplink may be classified into Joint Reception (JR) and Coordinated Scheduling/Beamforming (CS/CB).

The JR scheme is a method in which a plurality of reception points receives a signal transmitted through a PUSCH and the CS/CB scheme is a method that only one point receives a PUSCH and user scheduling/beamforming is determined by the coordination of the cells of the CoMP unit.

Figure 2:
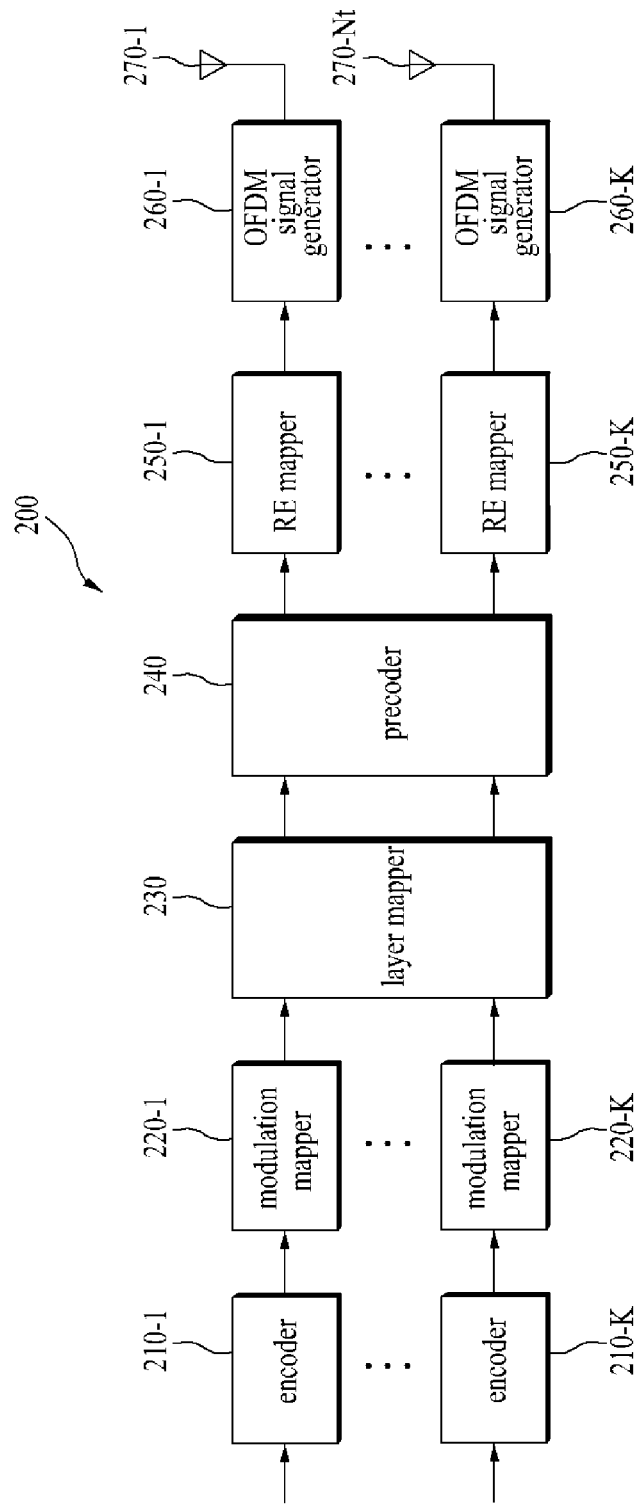
FIG. 2 is a block diagram illustrating a structure of a transmitter including multiple antennas.

FIG. 2 is a block diagram illustrating a structure of a transmitter including multiple antennas.

As shown in FIG. 2, the transmitter 200 includes encoders 210-1 to 210-K, modulation mappers 220-1 to 220-K, a layer mapper 230, a precoder 240, resource element mappers (or subcarrier mappers) 250-1 to 250-K, and Orthogonal Frequency Division Multiplexing (OFDM) signal generators 260-1 to 260-K. The transmitter 200 also includes Nt transmit antennas 270-1 to 270-K.

Each of the encoders 210-1 to 210-K encodes input data according to a predetermined coding scheme to create coded data. Each of the modulation mappers 220-1 to 220-K maps the coded data to a modulation symbol that represents a position on a signal constellation. The modulation scheme may be, but is not limited to, any of m-Phase Shift Keying (m-PKS) and m-Quadrature Amplitude Modulation (m-QAM). For example, the m-PSK may be BPSK, QPSK, or 8-PSK. The m-QAM may be 16-QAM, 64-QAM, or 256-QAM.

The layer mapper 230 defines a layer of the modulation symbol to allow the precoder 240 to distribute an antenna-specific symbol to a path of each antenna. The layer is defined as an information path input to the precoder 240. An information path prior to the precoder 240 may be referred to as a virtual antenna or a layer.

The precoder 240 processes the modulation symbol using a MIMO scheme in accordance with the multiple transmit antennas 270-1 to 270-Nt and outputs corresponding antenna-specific symbols. The precoder 240 distributes the antenna-specific symbols to the resource element mappers 250-1 to 250-K of paths of the corresponding antennas. Each information path transmitted by the precoder 240 to a single antenna is referred to as a stream. This can be considered a physical antenna.

The resource element mappers 250-1 to 250-K allocate the antenna-specific symbols to appropriate resource elements and multiplex the antenna-specific symbols according to the user. The OFDM signal generators 260-1 to 260-K modulate the antenna-specific symbols according to the OFDM scheme and output OFDM symbols. The OFDM signal generators 260-1 to 260-K may perform Inverse Fast Fourier Transform (IFFT) on the antenna-specific symbols and may insert a Cyclic Prefix (CP) into each time-domain symbol produced through IFFT. The CP is a signal that is inserted into a guard interval in order to remove inter-symbol interference which is caused by multiple paths in the OFDM transmission scheme. The OFDM symbol is transmitted through each of the transmit antennas 270-1 to 270-Nt.

A structure of a downlink radio frame is described below with reference to FIGS. 3 and 4.

In a cellular OFDM radio packet communication system, uplink/downlink data packets are transmitted in units of subframes and one subframe is defined as a time interval including a plurality of OFDM symbols. The 3GPP LTE standard supports a type-1 radio frame structure which is applicable to Frequency Division Duplex (FDD) and a type-2 radio frame structure which is applicable to Time Division Duplex (TDD).

Figure 3:
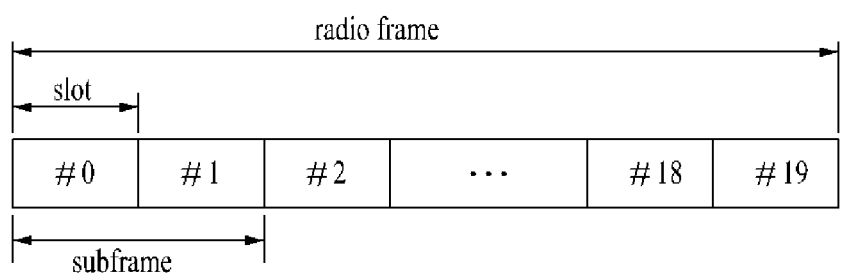
FIG. 3 illustrates a structure of a type-1 radio frame.

FIG. 3 illustrates a structure of a type-1 radio frame. One downlink radio frame includes 10 subframes, each of which includes two slots. A time required to transmit one subframe is defined as a Transmission Time Interval (TTI). For example, one subframe may have a length of 1 ms and one slot may have a length of 0.5 ms. One slot may include a plurality of OFDM symbols in the time domain and include a plurality of Resource Blocks (RBs) in the frequency domain.

The number of OFDM symbols included in one slot may vary depending on the configuration of a Cyclic Prefix (CP). CPs include an extended CP and a normal CP. For example, in the case where the OFDM symbols are configured using the normal CP, the number of OFDM symbols included in one slot may be 7. In the case where the OFDM symbols are configured using the extended CP, the length of one OFDM symbol is increased such that the number of OFDM symbols included in one slot is less than when the normal CP is used. In the case where the extended CP is used, the number of OFDM symbols included in one slot may be, for example, 6. When the channel state is unstable, for example, when a User Equipment (UE) moves at a high speed, the extended CP may be used in order to further reduce inter-symbol interference.

In the case where the normal CP is used, one subframe includes 14 OFDM symbols since one slot includes 7 OFDM symbols. In this case, the first 2 or 3 OFDM symbols of each subframe may be allocated to a Physical Downlink Control Channel (PDCCH) and the remaining OFDM symbols may be allocated to a Physical Downlink Shared Channel (PD-CCH).

Figure 4:
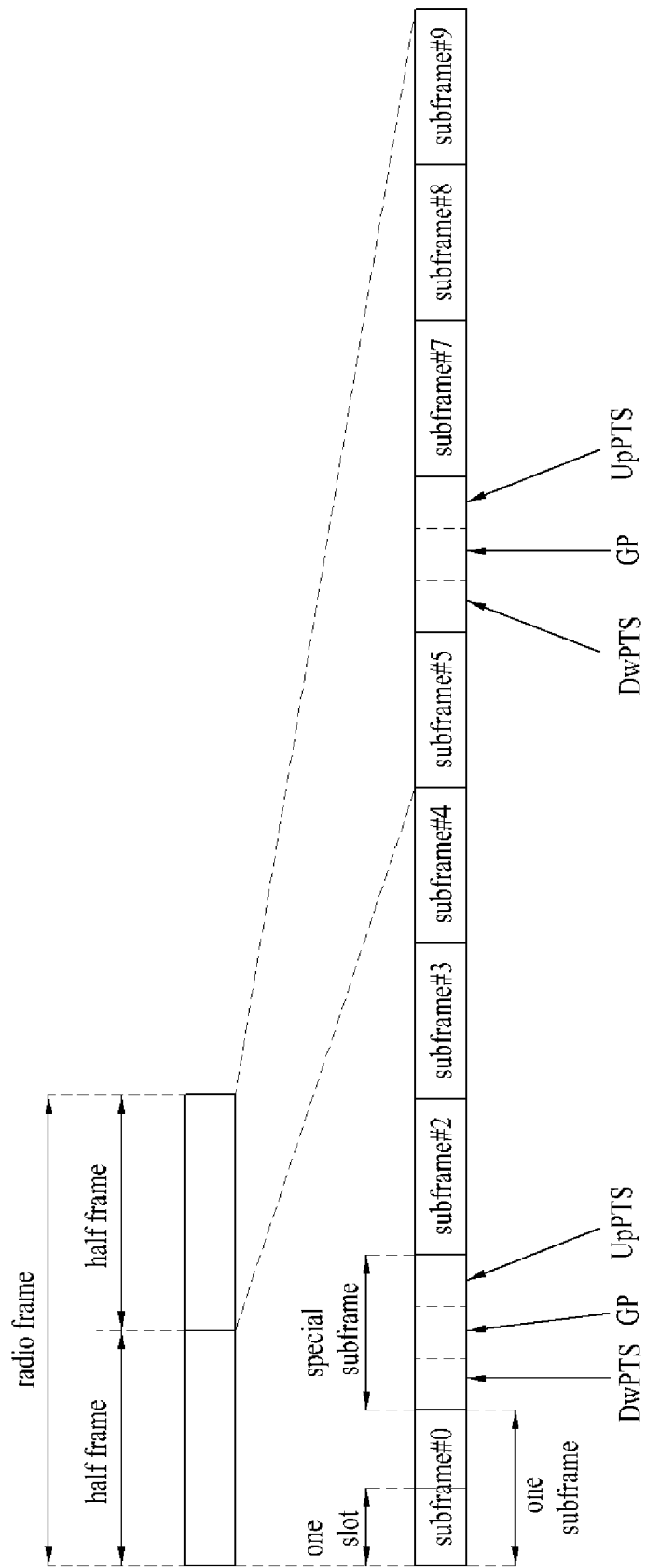
FIG. 4 illustrates a structure of a type-2 radio frame.

FIG. 4 illustrates a structure of a type-2 radio frame. A type-2 radio frame includes 2 half frames, each of which includes 5 subframes. Subframes may be classified into general subframes and special subframes. A special subframe includes 3 fields, i.e., Downlink Pilot Time Slot (DwPTS), Gap Period (GP), and Uplink Pilot Tile Slot (UpPTS) fields. Although the lengths of these three fields may be individually set, the total length of the three fields should be 1 ms. One subframe includes 2 slots. That is, one subframe includes 2 slots, regardless of the type of the radio frame.

The structure of the radio frame is only exemplary and the number of subframes included in the radio frame, the number of slots included in each subframe, or the number of symbols included in each slot may be changed in various manners.

Figure 5:
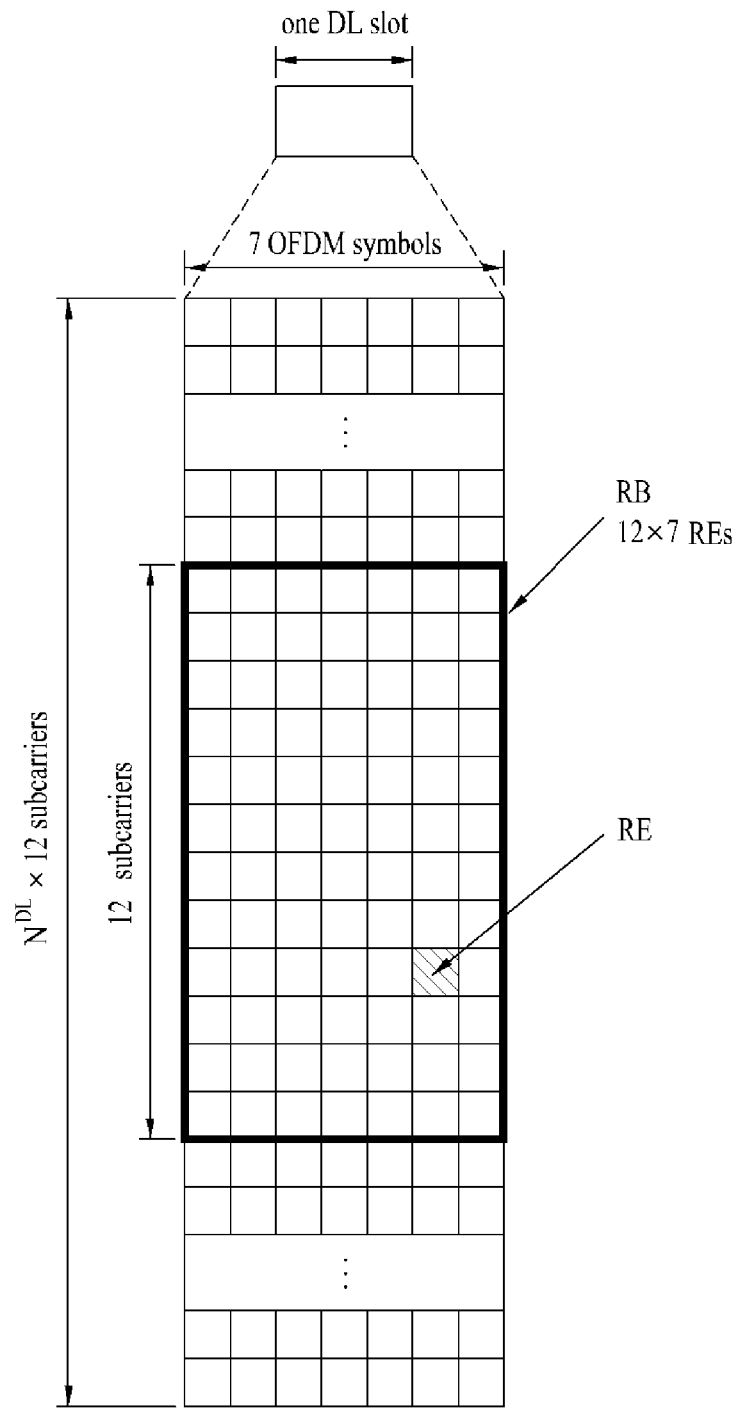
FIG. 5 illustrates an example of a resource grid in one downlink slot.

FIG. 5 illustrates an example of a resource grid in one downlink slot. In this example, OFDM symbols are configured using the normal CP. As shown in FIG. 5, the downlink slot includes a plurality of OFDM symbols in the time domain and includes a plurality of Resource Blocks (RBs) in the frequency domain. Although one downlink slot includes 7 OFDM symbols and one RB includes 12 subcarriers in the example, the present invention is not limited to this example. Each element of the resource grid is referred to as a Resource Element (RE). For example, an RE a(k, l) is located at a k-th subcarrier and an l-th OFDM symbol. One RB includes 12×7 REs in the case of the normal CP (12×6 REs in the case of the extended CP). Since the distance between each subcarrier is 15 kHz, one RB includes about 180 kHz in the frequency region. $N^{DL}$ denotes the number of RBs included in the downlink slot. The value $N^{DL}$ is determined based on a downlink transmission bandwidth set by scheduling of a base station.

Figure 6:
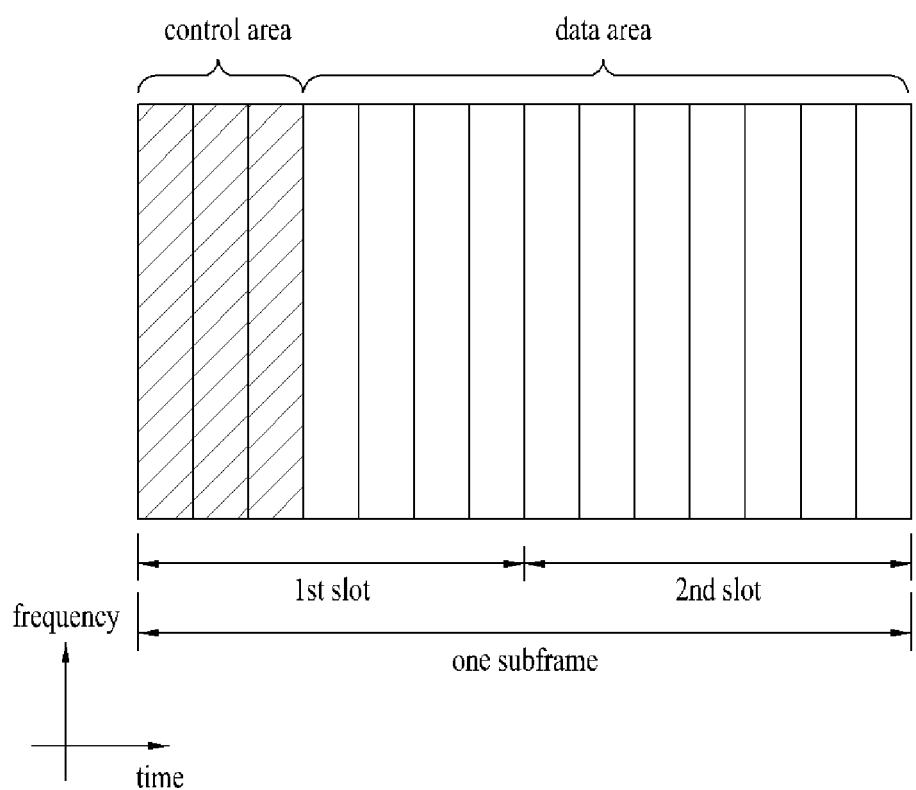
FIG. 6 illustrates the structure of a downlink subframe.

FIG. 6 illustrates the structure of a downlink subframe. Up to the first 3 OFDM symbols (i.e., the first OFDM symbol, the first 2 OFDM symbols, or the first 3 OFDM symbols) of a first slot within one subframe correspond to a control area to which a control channel is allocated. The remaining OFDM symbols correspond to a data area to which a Physical Downlink Shared Channel (PDSCH) is allocated. A basic transmission unit is one subframe. That is, a PDCCH and a PDSCH are allocated over 2 slots. Downlink control channels used in the 3GPP LTE system include, for example, a Physical Control Format Indicator Channel (PCFICH), a Physical Downlink Control Channel (PDCCH), and a Physical Hybrid automatic repeat request Indicator Channel (PHICH). The PCFICH is transmitted in the first OFDM symbol of a subframe and includes information regarding the number of OFDM symbols used to transmit a control channel in the subframe. The PHICH includes a HARQ ACK/NACK signal as a response to uplink transmission. Control information transmitted through the PDCCH is referred to as Downlink Control Information (DCI). The DCI includes uplink or downlink scheduling information or includes an uplink transmission power control command for a UE group. The PDCCH may include a resource allocation and transmission format of a Downlink Shared Channel (DL-SCH), resource allocation information of an Uplink Shared Channel (UL-SCH), paging information of a Paging Channel (PCH), system information of the DL-SCH, information regarding resource allocation of a higher layer control message such as a Random Access Response (RAR) that is transmitted in the PDSCH, a set of transmission power control commands for individual UEs in a UE group, transmission power control information, and information regarding activation of Voice over IP (VoIP). A plurality of PDCCHs may be transmitted within the control area. The UE may monitor the plurality of PDCCHs. The PDCCHs are transmitted in an aggregation (or combination) of one or more consecutive Control Channel Elements (CCEs). Each CCE is a logical allocation unit that is used to provide the PDCCHs at a coding rate based on the state of a radio channel. The CCE corresponds to a plurality of resource element groups. The format of the PDCCH and the number of available bits are determined based on a correlation between the number of CCEs and a coding rate provided by the CCEs. The base station (eNB) determines the PDCCH format according to a DCI that is transmitted to the UE, and adds a Cyclic Redundancy Check (CRC) to control information. The CRC is masked with a Radio Network Temporary Identifier (RNTI) according to the owner or usage of the PDCCH. If the PDCCH is associated with a specific UE, the CRC may be masked with a cell-RNTI (C-RNTI) of the UE. If the PDCCH is associated with a paging message, the CRC may be masked with a paging indicator identifier (P-RNTI). If the PDCCH is associated with system information (more specifically, a system information block (SIB)), the CRC may be masked with a system information identifier and a system information RNTI (SI-RNTI). To indicate a random access response that is a response to transmission of a random access preamble from the UE, the CRC may be masked with a random access-RNTI (RA-RNTI).

Figure 7:
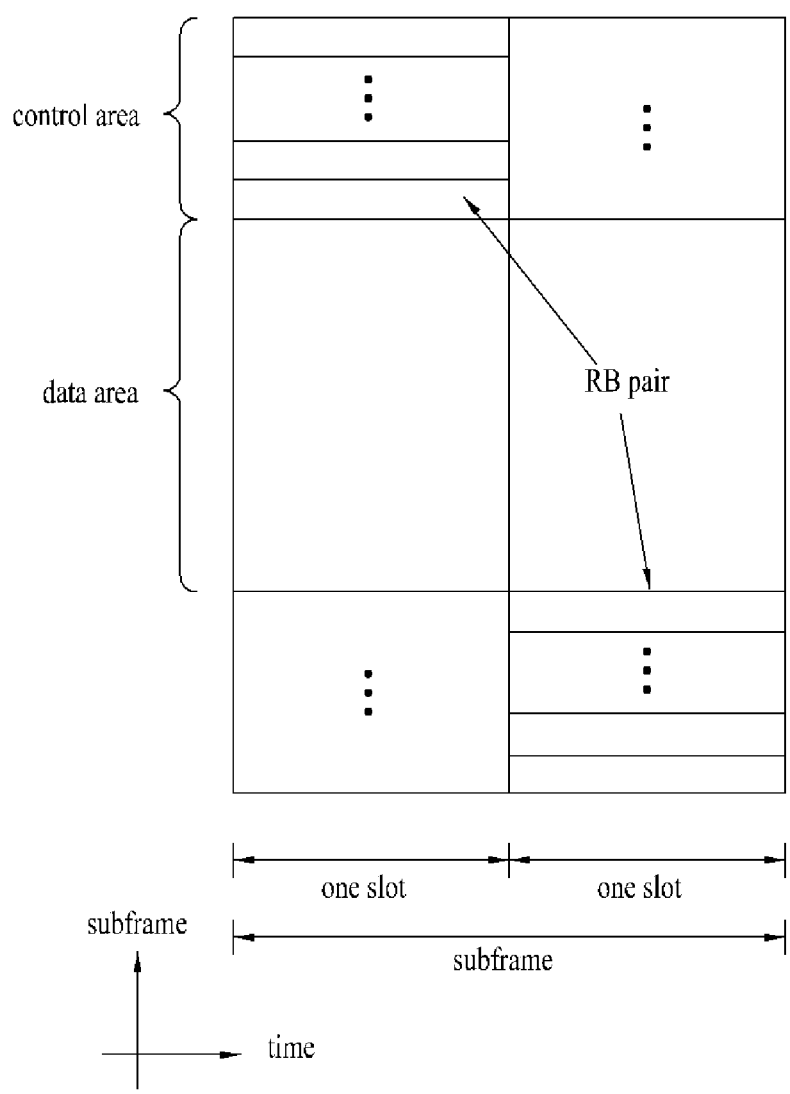
FIG. 7 illustrates the structure of an uplink subframe.

FIG. 7 illustrates the structure of an uplink subframe. The uplink subframe may be divided into a control area and a data area in the frequency domain. A Physical Uplink Control Channel (PUCCH) including uplink control information is allocated to the control area. A Physical Uplink Shared Channel (PUSCH) including user data is allocated to the data area. The PUCCH have three main purposes, transmission of an ACK/NACK for the PDSCH, transmission of a Channel Quality Indicator (CQI) for frequency region scheduling of the PDSCH, and PUSCH transmission resource request (scheduling request). CQI information bits may include one or more fields. For example, the CQI information bits may include a CQI field indicating a CQI index for determining a Modulation and Coding Scheme (MCS), a Precoding Matrix Indictor (PMI) field indicating the index of a precoding matrix in a codebook, and a Rank Indicator (RI) indicating the rank.

In order to maintain single carrier properties, one UE does not simultaneously transmit the PUCCH and the PUSCH. A PUCCH associated with one UE is allocated to an RB pair in a subframe. RBs belonging to the RB pair occupy different subcarriers in two slots. That is, the RB pair allocated to the PUCCH is "frequency-hopped" at a slot boundary.

Multi-Input Multi-Output (MIMO) System

FIG. 8 is a diagram showing the configuration of a wireless communication system having multiple antennas. As shown in FIG. 8(a), if the number of transmit antennas is increased to $N_T$ and the number of receive antennas is increased to $N_R$, a theoretical channel transmission capacity is increased in proportion to the number of antennas unlike when a plurality of antennas is used only in a transmitter or a receiver. Accordingly, it is possible to improve transfer rate and to remarkably improve frequency efficiency. As the channel transmission capacity is increased, the transfer rate may be theoretically increased by the product of the maximum transfer rate $R_O$ when a single antenna is used and a rate increase ratio $R_i$.

$$R_i = \min(N_T, N_R) \qquad \text{Expression 1}$$

For example, in an MIMO system using four transmit antennas and four receive antennas, it is possible to theoretically acquire a transfer rate which is four times that of a single antenna system. After theoretical capacity increase of the multi-antenna system was proven in the mid-90s, various technologies for actually improving data transfer rate have been vigorously studied. In addition, some of such technologies have already been applied to various wireless communication standards such as third-generation mobile communication and next-generation wireless LAN.

Multi-antenna related studies have been conducted in various aspects, such as study of information theory associated with multi-antenna communication capacity calculation in various channel environments and multiple access environments, study of wireless channel measurement and model derivation of a multi-antenna system, study of time-space processing technology for improving transfer rate.

The communication method of the MIMO system will be described in more detail using mathematical modeling. In the above system, it is assumed that $N_T$ transmit antennas and $N_R$ receive antennas are present.

The maximum number of pieces of information that can be transmitted through transmission signals is $N_T$ if $N_T$ transmit antennas are present. The transmitted information may be expressed as follows.

$$S = [S_1, S_2, \ldots, S_{N_T}]^T \qquad \text{Expression 2}$$

The transmitted information $S_1, S_2, \ldots, S_{N_T}$ may have different transmission powers. If the respective transmission powers are $P_1, P_2, \ldots, P_{N_T}$, the transmitted information with adjusted powers may be expressed as follows.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \qquad \text{Expression 3}$$

In addition, Ŝ may be expressed using a diagonal matrix P of the transmission powers as follows.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{Expression 4}$$

Let us consider that the $N_T$ actually transmitted signals $x_1, x_2, \ldots, x_{N_T}$ are configured by applying a weight matrix W to the information vector Ŝ with the adjusted transmission powers. The weight matrix W serves to appropriately distribute the transmitted information to each antenna according to the state of a transport channel or the like. $x_1, x_2, \ldots, x_{N_T}$ may be expressed using the vector X as follows.

$$x = \begin{bmatrix} x_1 \\ x_2 \\ \vdots \\ x_i \\ \vdots \\ x_{N_T} \end{bmatrix} \quad \text{Expression 5}$$

$$= \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & & \ddots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix}$$

$$= W\hat{s} = WPs,$$

where $W_{ij}$ denotes a weight between an i-th transmit antenna and j-th information. W is also referred to as a precoding matrix.

If $N_R$ receive antennas are present, respective received signals $y_1, y_2, \ldots, y_{N_R}$ of the antennas are expressed as follows.

$$y = [y_1, y_2, \ldots, y_{N_R}]^T \quad \text{Expression 6}$$

If channels are modeled in the MIMO wireless communication system, the channels may be distinguished according to transmit and receive antenna indexes. Let $h_{ij}$ represent a channel from the transmit antenna j to the receive antenna i. Note that the indexes of the receive antennas precede the indexes of the transmit antennas in $h_{ij}$.

FIG. 8(b) is a diagram showing channels from the $N_T$ transmit antennas to the receive antenna i. The channels may be combined and expressed in the form of a vector and a matrix. In FIG. 8(b), the channels from the $N_T$ transmit antennas to the receive antenna i may be expressed as follows.

$$h_i^T = [h_{i1}, h_{i2}, \ldots, h_{iN_T}] \quad \text{Expression 7}$$

Accordingly, all the channels from the $N_T$ transmit antennas to the $N_R$ receive antennas may be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R 1} & h_{N_R 2} & \cdots & h_{N_R N_T} \end{bmatrix} \quad \text{Expression 8}$$

An Additive White Gaussian Noise (AWGN) is added to the actual channels after the channels undergo a channel matrix H. The AWGN $n_1, n_2, \ldots, n_{N_R}$ added to the $N_T$ transmit antennas may be expressed as follows.

$$n = [n_1, n_2, \ldots, n_{N_R}]^T \quad \text{Expression 9}$$

Through the above-described mathematical modeling, the received signals may be expressed as follows.

$$y = \begin{bmatrix} y_1 \\ y_2 \\ \vdots \\ y_i \\ \vdots \\ y_{N_R} \end{bmatrix} \quad \text{Expression 10}$$

$$= \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix}$$

$$= Hx + n$$

The number of rows and columns of the channel matrix H indicating the channel state is determined by the number of transmit and receive antennas. The number of rows of the channel matrix H is equal to the number $N_R$ of receive antennas and the number of columns thereof is equal to the number $N_T$ of transmit antennas. That is, the channel matrix H is an $N_R \times N_T$ matrix.

The rank of the matrix is defined as the smallest number of rows or columns which are independent of each other. Accordingly, the rank of the matrix cannot be greater than the number of rows or columns of the matrix. The rank rank(H) of the channel matrix H is restricted as follows.

$$\text{rank}(H) \leq \min(N_T, N_R) \quad \text{Expression 11}$$

When the matrix is subjected to Eigen value decomposition, the rank may be defined as the number of Eigen values excluding 0. Similarly, the rank may also be defined as the number of singular values excluding 0 when the matrix is subjected to singular value decomposition. Accordingly, the physical meaning of the rank in the channel matrix may be considered the maximum number of different pieces of information that can be transmitted in a given channel.

In the description of this disclosure, the 'rank' of MIMO transmission indicates the number of paths through which a signal can be independently transmitted at a specific time and a specific frequency resource and the 'number of layers' indicates the number of signal streams transmitted through the paths. Generally, since the transmission end transmits a number of layers corresponding to the rank number used for signal transmission, the rank has the same meaning as the number of layers unless specifically stated otherwise.

Reference Signal (RS)

In a wireless communication system, a signal may be distorted during transmission since packets are transmitted through a radio channel. In order to enable a receiving side to correctly receive the distorted signal, distortion of the received signal should be corrected using channel information. A method of transmitting a signal, of which both the transmitting side and the receiving side are aware, and determining channel information using the degree of distortion that has occurred when the signal is received through a channel is mainly used to determine the channel information. This signal is referred to as a pilot signal or a reference signal (RS).

When data is transmitted and received using multiple antennas, channel states between the transmit antennas and the receive antennas should be determined to correctly receive the signal. Accordingly, an individual RS should be present for each transmit antenna.

A downlink RS is classified into a Common RS (CRS) shared among all UEs in a cell and a Dedicated RS (DRS) only for a specific UE. Information for channel estimation and demodulation may be provided using such RSs.

The receiving side (UE) may estimate the state of a channel from the CRS and may feed an indicator associated with the quality of the channel, such as a Channel Quality Indicator (CQI), a Precoding Matrix Index (PMI) and/or a Rank Indicator (RI), back to the transmitting side (eNodeB). The CRS may also be referred to as a cell-specific RS. Alternatively, an RS associated with the feedback of Channel State Information (CSI) such as CQI/PMI/RI may be separately defined as a CSI-RS.

The DRS may be transmitted through REs when data demodulation of a PDSCH is necessary. The UE may receive information indicating the presence or absence of the DRS from a higher layer and receive information as to whether or not the DRS is valid only when a PDSCH is mapped to the DRS. The DRS may also be referred to as a UE-specific RS or a Demodulation RS (DMRS).

FIG. 9 is a diagram showing a pattern of mapping of CRSs and DRSs onto a downlink RB defined in the existing 3GPP LTE system (e.g., Release-8). The downlink RB as a mapping unit of the RSs may be expressed in units of one subframe on the time domain×12 subcarriers on the frequency domain. That is, on the time axis, one RB has a length of 14 OFDM symbols in the case of the normal CP (FIG. 9(a)) and has a length of 12 OFDM symbols in the case of the extended CP (FIG. 9(b)).

FIG. 9 shows the locations of RSs on an RB in the system in which an eNodeB supports four transmit antennas. In FIG. 9, Resource Elements (REs) denoted by "0", "1", "2" and "3" indicate the locations of CRSs of the antenna port indexes 0, 1, 2 and 3, respectively. In FIG. 9, the RE denoted by "D" indicates the location of a DRS.

Hereinafter, the CRS will be described in detail.

The CRS is used to estimate the channel of a physical antenna and is distributed over the entire band as an RS which can be commonly received by all UEs located within a cell. The CRS may be used for CSI acquisition and data demodulation.

The CRS is defined in various formats according to the antenna configuration of the transmitting side (eNodeB). The 3GPP LTE (e.g., Release-8) system supports various antenna configurations, and a downlink signal transmitting side (eNodeB) has three antenna configurations such as a single antenna, two transmit antennas and four transmit antennas. When the eNodeB performs single-antenna transmission, RSs for a single antenna port are arranged. When the eNodeB performs two-antenna transmission, RSs for two antenna ports are arranged according to a Time Division Multiplexing (TDM) and/or a Frequency Division Multiplexing (FDM) scheme. That is, RSs for two antenna ports are arranged in different time resources and/or different frequency resources such that the RSs for the two antenna ports can be distinguished from each other. In addition, when the eNodeB performs four-antenna transmission, RSs for four antenna ports are arranged according to the TDM/FDM scheme. The channel information estimated by the downlink signal receiving side (UE) through the CRSs may be used to demodulate data transmitted using a transmission scheme such as single antenna transmission, transmit diversity, closed-loop spatial multiplexing, open-loop spatial multiplexing, or Multi-User MIMO (MU-MIMO).

When RSs are transmitted through a certain antenna port in the case in which multiple antennas are supported, the RSs are transmitted at the locations of REs specified according to the RS pattern and no signal is transmitted at the locations of REs specified for another antenna port.

The rule of mapping the CRSs to the RBs is defined by Expression 12.

$$k = 6m + (v + v_{shift}) \bmod 6$$

$$l = \begin{cases} 0, N_{symb}^{DL} - 3 & \text{if } p \in \{0, 1\} \\ 1 & \text{if } p \in \{2, 3\} \end{cases}$$

$$m = 0, 1, \ldots, 2 \cdot N_{RB}^{DL} - 1$$

$$m' = m + N_{RB}^{max,DL} - N_{RB}^{DL}$$

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases}$$

$$v_{shift} = N_{ID}^{cell} \bmod 6$$

Expression 12

In Expression 12, k denotes a subcarrier index, l denotes a symbol index, and p denotes an antenna port index. $N_{symb}^{DL}$ denotes the number of OFDM symbols of one downlink slot, $N_{RB}^{DL}$ denotes the number of RBs allocated to the downlink, $n_s$ denotes a slot index, and $N_{ID}^{cell}$ denotes a cell ID. "mod" indicates a modulo operation. The location of the RS in the frequency domain depends on a value $V_{shift}$. Since the value $V_{shift}$ depends on the cell ID, the location of the RS has a frequency shift value which is different for each cell.

More specifically, in order to increase channel estimation performance through the CRSs, the locations of the CRSs in the frequency domain may be shifted so as to be changed according to the cells. For example, if RSs are located at intervals of three subcarriers, RSs may be arranged at 3k-th subcarriers in one cell while RSs may be arranged at (3k+1)-th subcarriers in another cell. From the viewpoint of one antenna port, RSs are arranged at intervals of 6 REs (that is, at intervals of 6 subcarriers) in the frequency domain while being separated from REs, on which RSs allocated to another antenna port are arranged, by 3 REs in the frequency domain.

In addition, power boosting may be applied to CRSs. Power boosting indicates that power of REs other than REs allocated for RSs among the REs of one OFDM symbol is used to transmit RSs with higher power.

In the time domain, RSs are arranged at specific time intervals, starting from a symbol index (l=0) of each slot. The time interval between each RS is defined differently according to the CP length. RSs are located at symbol indexes 0 and 4 of the slot in the case of the normal CP and are located at symbol indexes 0 and 3 of the slot in the case of the extended CP. RSs for only up to two antenna ports are defined in one OFDM symbol. Accordingly, in the case of four-transmit antenna transmission, RSs for the antenna ports 0 and 1 are located at symbol indexes 0 and 4 (symbol indexes 0 and 3 in the case of the extended CP) of the slot and RSs for the antenna ports 2 and 3 are located at the symbol index 1 of the slot. The frequency locations of the RSs for the antenna ports 2 and 3 in the frequency domain are switched with each other in the second slot.

In order to support spectrum efficiency higher than that of the existing 3GPP LTE (e.g., Release-8) system, a system (e.g., an LTE-A system) having an extended antenna configuration may be designed. The extended antenna configuration may be, for example, an 8-transmit-antenna configuration. A system having the extended antenna configuration needs to support UEs which operate in the existing antenna configuration, that is, needs to support backward compatibility. Accordingly, it is necessary to support an RS pattern according to the existing antenna configuration and to design a new RS pattern for an additional antenna configuration. If CRSs for new antenna ports are added to the system having the existing antenna configuration, there is a problem in that RS overhead is significantly increased, thereby reducing data transfer rate. In consideration of such circumstances, an LTE-A (Advanced) system which is an evolution of the 3GPP LTE system may adopt additional RSs (CSI-RSs) for measuring the CSI for the new antenna ports.

Hereinafter, the DRS will be described in detail.

The DRS (or the UE-specific RS) is used to demodulate data. A precoding weight used for a specific UE when multi-antenna transmission is performed is also used for an RS without change so as to allow the UE to estimate an equivalent channel, into which a transfer channel and the precoding weight transmitted from each transmit antenna are combined, when the UE receives the RSs.

The existing 3GPP LTE system (e.g., Release-8) supports transmission of up to 4 transmit antennas and defines the DRS for Rank 1 beamforming. The DRS for Rank 1 beamforming is also represented by an RS for antenna port index 5. The rule of mapping of the DRS onto an RB is defined by Expressions 13 and 14. Expression 13 represents the mapping rule for the normal CP and Expression 14 represents the mapping rule for the extended CP.

$$k = (k') \bmod N_{sc}^{RB} + N_{sc}^{RB} \cdot n_{PRB} \quad \text{Expression 13}$$

$$k' = \begin{cases} 4m' + v_{shift} & \text{if } l \in \{2, 3\} \\ 4m' + (2 + v_{shift}) \bmod 4 & \text{if } l \in \{5, 6\} \end{cases}$$

$$l = \begin{cases} 3 & l' = 0 \\ 6 & l' = 1 \\ 2 & l' = 2 \\ 5 & l' = 3 \end{cases}$$

$$l' = \begin{cases} 0, 1 & \text{if } n_s \bmod 2 = 0 \\ 2, 3 & \text{if } n_s \bmod 2 = 1 \end{cases}$$

$$m' = 0, 1, \ldots, 3N_{RB}^{PDSCH} - 1$$

$$v_{shift} = N_{ID}^{cell} \bmod 3$$

-continued $$k = (k') \bmod N_{sc}^{RB} + N_{sc}^{RB} \cdot n_{PRB} \quad \text{Expression 14}$$

$$k' = \begin{cases} 3m' + v_{shift} & \text{if } l = 4 \\ 3m' + (2 + v_{shift}) \bmod 3 & \text{if } l = 1 \end{cases}$$

$$l = \begin{cases} 4 & l' \in \{0, 2\} \\ 1 & l' = 1 \end{cases}$$

$$l' \begin{cases} 0 & \text{if } n_s \bmod 2 = 0 \\ 1, 2 & \text{if } n_s \bmod 2 = 1 \end{cases}$$

$$m' = 0, 1, \ldots, 4N_{RB}^{PDSCH} - 1$$

$$v_{shift} = N_{ID}^{cell} \bmod 3$$

In Expressions 13 and 14, k denotes a subcarrier index, l denotes a symbol index, and p denotes an antenna port index. $N_{DL}^{RB}$ denotes the resource block size in the frequency domain and is expressed as the number of subcarriers. $n_{PRB}$ denotes a physical resource block number. $N_{RB}^{PDSCH}$ denotes the bandwidth of the RB of PDSCH transmission. $n_s$ denotes a slot index, and $N_{ID}^{cell}$ denotes a cell ID. mod indicates a modulo operation. The location of the RS in the frequency domain depends on a value $V_{shift}$. Since the value $V_{shift}$ depends on the cell ID, the location of the RS has a frequency shift value which is different for each cell.

The LTE-A system which is an evolution of the 3GPP LTE system can support up to 8 transmit antennas. Accordingly, the LTE-A system also needs to support RSs for up to transmit antennas. Downlink RSs in the LTE system has been defined for only up to 4 antenna ports. Therefore, when an LTE-A system has 4 to 8 downlink transmit antennas, there is a need to additionally define RSs for the antenna ports in the LTE-A system. Both an RS for channel measurement and an RS for data modulation need to be taken into consideration as RSs for up to 8 transmit antenna ports.

One important consideration in designing an LTE-A system is backward compatibility. Backward compatibility is the ability to support existing LTE UEs such that the LTE UEs properly operate in the LTE-A system. If RSs for up to 8 transmit antennas are added to time-frequency regions in which a CRS defined in the LTE standard is transmitted every subframe over an entire band, RS overhead is excessively increased from the viewpoint of RS transmission. Therefore, there is a need to take into consideration RS overhead reduction when designing new RSs for up to 8 antenna ports.

RSs newly introduced in the LTE-A system may be largely classified into two types. One is a DeModulation RS (DM RS) which is an RS for demodulating data transmitted through up to 8 transmit antennas. If data is transmitted in a downlink subframe, a dedicated DM RS is transmitted only to a UE for which data transmission has been scheduled. A DM RS dedicated to a specific UE may be designed such that the DM RS is transmitted only in a resource region for which the UE has been scheduled, i.e., only in a time-frequency region in which data for the UE is transmitted. The other is a Channel State Information RS (CSI-RS) which is an RS for channel measurement for selection of a transmission rank, a Modulation and Coding Scheme (MCS), a Precoding Matrix Index (PMI), or the like.

The CSI-RS for channel measurement is characterized in that the CSI-RS is designed mainly for channel measurement unlike the CRS of the conventional LTE system which is used not only for measurement of handover or the like but also for data modulation. Of course, the CSI-RS may also be used for measurement of handover or the like. Since the CSI-RS is transmitted only for the purpose of obtaining information regarding a channel condition, the CSI-RS need not be transmitted every subframe, unlike the CRS of the conventional LTE system. Accordingly, to reduce CSI-RS overhead, the CSI-RS may be designed to be transmitted intermittently (for example, at regular intervals) in the time axis.

Figure 10:
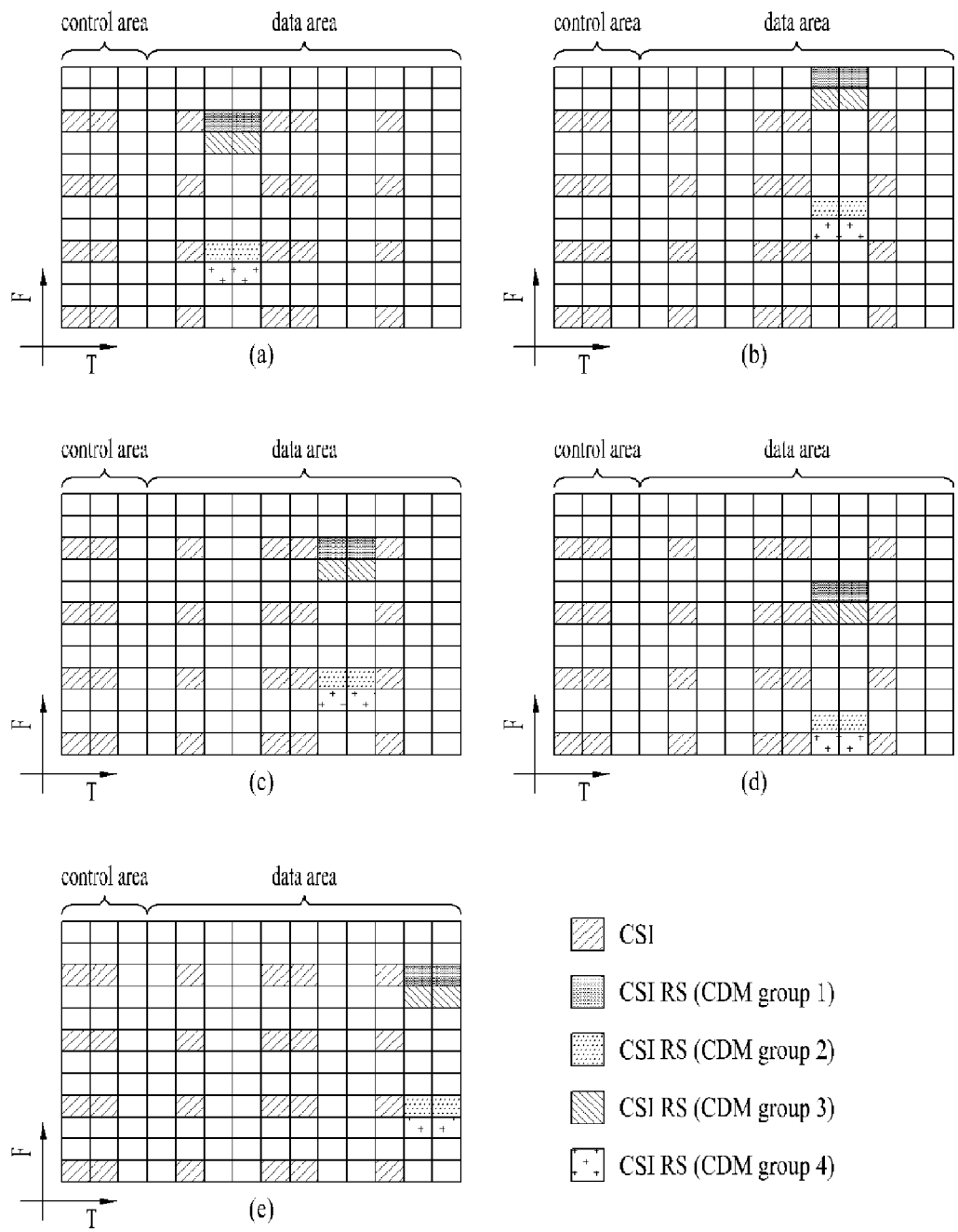
FIG. 10 illustrates exemplary CSI-RS patterns defined in the LTE-A system.

FIG. 10 illustrates exemplary CSI-RS patterns defined in the LTE-A system. Specifically, FIG. 10 shows the positions of resource elements in which a CSI-RS is transmitted in one resource block in which downlink data is transmitted. Here, one resource block, includes 14 OFDM symbols (in the time domain) and 12 subcarriers (in the frequency domain). One of the CSI-RS patterns of FIGS. 10(a) to 10(e) may be used in a downlink subframe. CSI-RSs may be transmitted for 8 antenna ports (antenna port indices 15, 16, 17, 18, 19, 20, and 21) which are additionally defined in the LTE-A system. CSI-RSs for different antenna ports may be discriminated by different frequency resources (subcarriers) and/or different time resources (OFDM symbols) at which the CSI-RSs are located (that is, the CSI-RSs may be multiplexed according to an FDM and/or TDM scheme). In addition, CSI-RSs for different antenna ports located at the same time-frequency resource may be discriminated by different orthogonal codes (that is, the CSI-RSs may be multiplexed according to a CDM scheme). CSI-RSs of antenna ports 15 and 16 in the example of FIG. 10(a) may be located at Resource Elements (REs) denoted as CSI-RS CDM group 1 and may be multiplexed through orthogonal codes. CSI-RSs of antenna ports 17 and 18 in the example of FIG. 10(a) may be located at Resource Elements (REs) denoted as CSI-RS CDM group 2 and may be multiplexed through orthogonal codes. CSI-RSs of antenna ports 19 and 20 in the example of FIG. 10(a) may be located at Resource Elements (REs) denoted as CSI-RS CDM group 3 and may be multiplexed through orthogonal codes. CSI-RSs of antenna ports 21 and 22 in the example of FIG. 10(a) may be located at Resource Elements (REs) denoted as CSI-RS CDM group 4 and may be multiplexed through orthogonal codes. The same principle described with reference to FIG. 10(a) may be applied to FIGS. 10(b) and 10(e).

The RS patterns of FIGS. 9 and 10 are merely exemplary and application of various embodiments of the present invention is not limited to specific RS patterns. That is, various embodiments of the present invention may be equally applied even when different RS patterns from those of FIGS. 9 and 10 are defined and used.

Channel Status Information Feedback

To properly perform the MIMO scheme, the receiving end may feed a Rank Indicator (RI), a Precoding Matrix Index (PMI), and a Channel Quality Indicator (CQI) back to the transmitting end. The RI, PMI, and CQI may be collectively referred to as Channel Status Information (CSI). To generate and calculate the CSI, the receiving end may perform channel estimation using a reference signal (CRS or CSI-RS) from the transmitting end.

The RI is information regarding the rank of a channel. The rank of the channel is the maximum number of layers through which different information can be transmitted. The RI may be determined from the number of allocated transmission layers and may be acquired from related Downlink Control Information (DCI).

The PMI is information regarding a precoding matrix used for transmission from the transmitting end. The term "precoding" refers to mapping of a transmission layer to a transmit antenna and a layer-antenna mapping relationship may be determined by the precoding matrix. To reduce feedback overhead of the precoding information, it is possible to use a method in which the transmitting end and the receiving end share a codebook including a number of precoding matrices and only an index indicating a specific precoding matrix among the precoding matrices of the codebook may be fed back.

The CQI is information indicating channel quality. The CQI may be expressed as a predetermined MCS combination. That is, a CQI index that is fed back indicates a corresponding modulation scheme and code rate.

A new CSI feedback may be applied to a system (for example, the LTE-A system) that supports an extended antenna configuration. For example, precoding information fed back by the receiving end may be indicated by a combination of 2 PMIs. One of the 2 PMIs (1st PMI) may have an attribute of a long term wideband and may be referred to as W1. The other of the 2 PMIs (2nd PMI) may have an attribute of a short term wideband and may be referred to as W2. A final PMI may be determined by a combination (or function) of W1 and W2. For example, when the final PMI is W, W may be defined such that W=W1*W2 or W=W2*W1.

As described above, the CSI in the LTE-A system may include the RI, W1, W2, and CQI and thus there is a need to define a new method for transmitting and receiving feedback information of each of the CSI items. Specific embodiments of the present invention associated with this will be described later.

CSI Report in CoMP System

A UE in a CoMP system may receive downlink channels from multiple cells and may feed CSI regarding the downlink channels from the cells back. In the following description, a cell which participates in or may participate in a CoMP operation is referred to as a CoMP cell. A UE which performs or may perform transmission and reception according to the CoMP operation is referred to as a CoMP UE. Although the following examples are described with reference to the case in which the number of cells that participate in a CoMP operation is 2 as an example for ease of explanation, the scope of the present invention is not limited thereto and the principle of the present invention can be equally applied to the case in which 3 or more CoMP cells are present.

Figure 11:
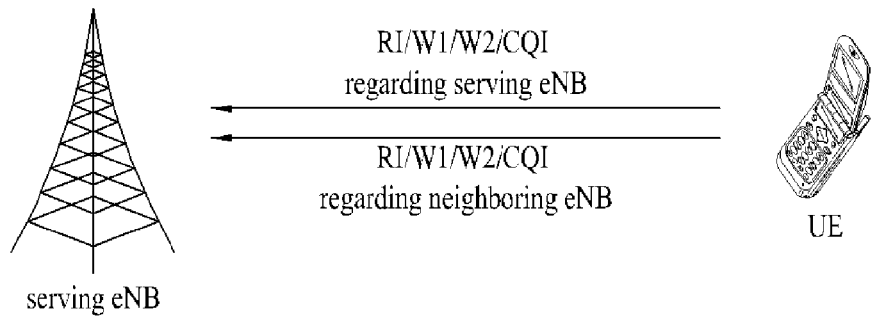
FIG. 11 illustrates exemplary CSI feedback in a CoMP system.

FIG. 11 illustrates exemplary CSI feedback in a CoMP system. When a UE feeds CSI regarding each CoMP cell back, the UE may transmit CSI regarding an adjacent cell (or a neighboring cell (eNB)) which participates in a CoMP operation using the same method manner as the method of transmitting CSI regarding the serving cell. For example, assuming that one neighboring cell participates in a CoMP operation, a CoMP UE may calculate CSI in the same format for each of the serving cell and the neighboring cell and feed the CSI back. When a radio channel is present between the CoMP UE and the neighboring cell, the CoMP UE may feed the CSI regarding the neighboring cell directly back to the neighboring cell. Alternatively, as shown in FIG. 11, the UE which is served by the serving cell may feed CSI (RI, W1, W2, and CQI) regarding the neighboring cell back to the serving cell. In this case, the CSI information fed back by the UE may be shared between the cells through a backhaul link.

As described above, when CSI is fed back in the same manner for each CoMP cell, CSI feedback overhead may increase as the number of CoMP cells increases. In this case, the amount of resources that the UE can use for data transmission among resources that the UE can use for transmission to the eNB decreases as control signal overhead increases. The following is a detailed description of an efficient CSI transmission method which can reduce feedback overhead while achieving sufficient CSI accuracy.

First, the characteristics of each of the R1, W1, W2, and CQI that constitute the CSI are described below.

The R1 and W1 reflect average channel characteristics in frequency or time. That is, the R1 and W1 may reflect wideband channel characteristics in the frequency domain and may reflect long term channel characteristics in the time domain. In order to simply express such characteristics of the RI and W1, the R1 and W1 are referred to as CSI having a long-term-wideband attribute (or CSI of long-term-wideband attribute) in this disclosure. That is, the term "CSI of long-term-wideband attribute" refers to CSI which reflects characteristics of a long term channel in the time domain, CSI which reflects characteristics of a wideband channel in the frequency domain, or CSI which reflects characteristics of a long term channel in the time domain while reflecting characteristics of a wideband channel in the frequency domain.

On the other hand, the W2 and the CQI are determined based on the R1 and W1 and reflect instantaneous channel characteristics compared to the RI and W1. That is, the W2 and CQI may reflect wideband channel characteristics in the frequency domain and may reflect long term channel characteristics in the time domain. In order to simply express such characteristics of the W2 and CQI, the R1 and W1 are referred to as CSI having a short-term-subband attribute (or CSI of long-term-wideband attribute) in this disclosure. That is, the term "CSI of long-term-wideband attribute" refers to CSI which reflects characteristics of a short term channel in the time domain, CSI which reflects characteristics of a subband channel in the frequency domain, or CSI which reflects characteristics of a short term channel in the time domain while reflecting characteristics of a subband channel in the frequency domain.

Figure 12:
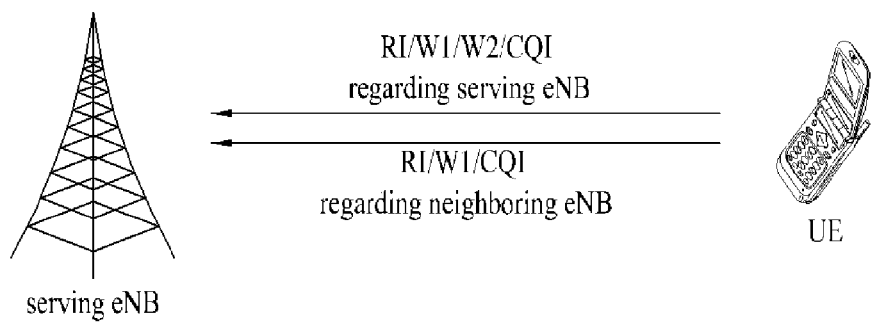
FIG. 12 illustrates another exemplary CSI feedback in a CoMP system.

FIG. 12 illustrates another exemplary CSI feedback in a CoMP system. When a UE feeds CSI regarding each CoMP cell back, the UE may feed an RI, a W1, a W2, and a CQI regarding the serving cell back and may feed only the RI, W1, and CQI excluding the W2 regarding the neighboring cell back. In this case, since a PMI regarding the neighboring cell includes only the W1 without the W2, it is possible to reduce feedback overhead by an amount corresponding to transmission of the W2 although the PMI may have a greater quantization error than a PMI which uses both the W1 and W2. The CSI feedback for the neighboring cell is used to determine whether or not the neighboring cell participates in the CoMP operation and also to determine which CoMP scheme is used for the operation. That is, even when CSI of the neighboring cell has been fed back, it may be determined that the neighboring cell does not participate in the CoMP operation. Accordingly, reducing feedback overhead at the cost of slight accuracy reduction may be more beneficial than providing correct CSI with high feedback overhead for the neighboring cell.

It is possible to achieve sufficient MU-MIMO gain by feeding more accurate channel information regarding the serving cell back as described above. That is, to perform MU-MIMO, there is a need to more accurately feed channel states for a plurality of UEs back and, when more accurate PMI is fed back, it is possible to perform a MU-MIMO operation with higher performance. In addition, feedback of average channel information which is relatively inaccurate for the neighboring cell that participates in the CoMP operation may suffice to participate in coordinated beamforming or joint transmission.

Here, the CQI of the neighboring cell may correspond to CSI long-term-wideband attribute calculated using the RI and W1. That is, W2 of short-term-subband attribute is not transmitted for the neighboring cell and the remaining RI, W1, and CQI may all be considered corresponding to CSI of long-term-wideband attribute. When all CSI items of the neighboring cell correspond to CSI of long-term-wideband attribute, the feedback period increases (i.e., the CSI is fed back less frequently) and channel information of a greater frequency band is fed back. As a result, it is possible to achieve the advantage of reducing CSI feedback overhead per resource unit.

When a radio channel is present between the CoMP UE and the neighboring cell, the CoMP UE may feed the CSI regarding the neighboring cell directly back to the neighboring cell. Alternatively, as shown in FIG. 12, the UE which is served by the serving cell may feed CSI (RI, W1, and CQI) regarding the neighboring cell back to the serving cell. In this case, the CSI information fed back by the UE may be shared between the cells through a backhaul link.

Figure 13:
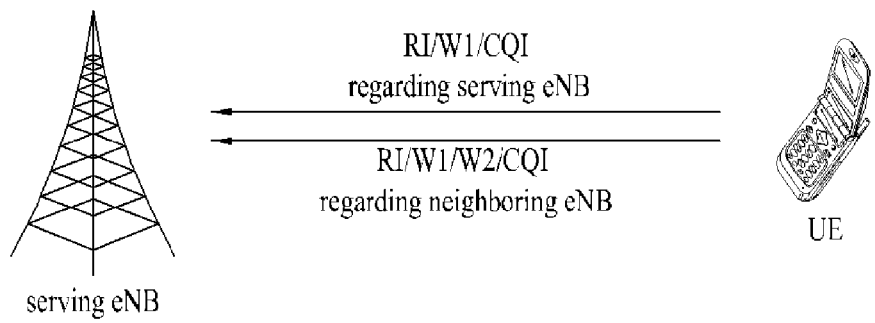
FIG. 13 illustrates another exemplary CSI feedback in a CoMP system.

FIG. 13 illustrates another exemplary CSI feedback in a CoMP system. When a UE feeds CSI regarding each CoMP cell back, the UE may feed the RI, W1, and CQI excluding the W2 regarding the serving cell back and may feed the RI, W1, W2 and CQI regarding the neighboring cell back. That is, the feedback method of FIG. 13 omits feedback of the W2 regarding the serving cell in the opposite manner to the feedback method of FIG. 12.

In this case, the gain of MU-MIMO performed by the serving cell may be reduced as much as the accuracy of a PMI regarding the serving cell is reduced. However, the PMI with slightly low accuracy may suffice for the serving cell to perform SU-MIMO for the UE and may also allow the serving cell to achieve a gain sufficient for performing the CoMP operation with the neighboring cell. Accordingly, the serving cell may serve the UE according to the SU-MIMO scheme and the neighboring cell may operate according to a coordinated beamforming scheme. Here, from the viewpoint of the neighboring cell, it is possible to more efficiently reduce interference to the serving cell using a highly accurate PMI (i.e., W1 and W2 regarding the neighboring cell) which is fed back by the UE.

When a radio channel is present between the CoMP UE and the neighboring cell, the CoMP UE may feed the CSI regarding the neighboring cell directly back to the neighboring cell. Alternatively, as shown in FIG. 13, the UE which is served by the serving cell may feed CSI (RI, W1, W2, and CQI) regarding the neighboring cell back to the serving cell. In this case, the CSI information fed back by the UE may be shared between the cells through a backhaul link.

The following is a description of a method for additionally reducing feedback overhead. The additional feedback overhead reduction method may be applied to various embodiments suggested in the present invention.

First, it is possible to additionally reduce feedback overhead by restricting an RI regarding a neighboring cell that is fed back by a UE.

In one example, an RI of a neighboring cell, which is fixed to 1, may be used. That is, a CoMP UE may always fix a rank value to 1 when calculating and reporting a CSI regarding a neighboring cell and may calculate and report a PMI and a CQI assuming that the rank is 1. In this case, the PMI regarding the neighboring cell reported by the CoMP UE is a column vector and this value indicates a direction in which the intensity of interference caused by a channel from the neighboring cell is highest. Thus, the neighboring cell which participates in the CoMP operation can reduce interference by performing beamforming in a direction other than the beam direction in which the neighboring cell causes the highest interference to the serving cell. Alternatively, when the neighboring cell performs a CoMP operation according to a joint transmission scheme, the neighboring cell may perform beamforming in a channel direction in which the neighboring cell causes the highest interference.

In another example, the RI of the neighboring cell may be fixed to the same as the RI of the serving cell. For example, when the value of an RI that a CoMP UE reports as a CSI to the serving cell is "r", the UE may also report an RI regarding the neighboring cell which is fixed to "r" and may calculate and report a PMI and a CQI assuming that the rank is "r". In this case, the PMI regarding the neighboring cell reported by the CoMP UE includes r column vectors. Here, each column vector of the PMI regarding the neighboring cell may indicate a direction of an interference channel in which the intensity of interference caused by the neighboring cell is the highest and may indicate a direction of an interference channel in which the intensity of interference caused by the neighboring cell is the lowest.

When the r column vectors of the PMI regarding the neighboring cell indicate a channel direction which causes the highest interference, the neighboring cell may perform a CoMP operation in the following manner. For example, when the neighboring cell performs a CoMP operation according to a coordinated beamforming scheme, the neighboring cell can reduce interference by performing beamforming in a direction other than the r channel directions which cause the highest interference. Alternatively, when the neighboring cell performs a CoMP operation according to a joint transmission scheme, the neighboring cell may perform beamforming in the 4 channel directions in which the neighboring cell causes the highest interference.

On the other hand, when the r column vectors of the PMI regarding the neighboring cell indicate a channel direction which causes the lowest interference, the neighboring cell may perform a CoMP operation in the following manner. For example, when the neighboring cell performs a CoMP operation according to a coordinated beamforming scheme, the neighboring cell can reduce interference by performing beamforming in the r channel directions which cause the lowest interference. Alternatively, when the neighboring cell performs a CoMP operation according to a joint transmission scheme, the neighboring cell may perform beamforming in a direction other than the 4 channel directions in which the neighboring cell causes the lowest interference.

Figure 14:
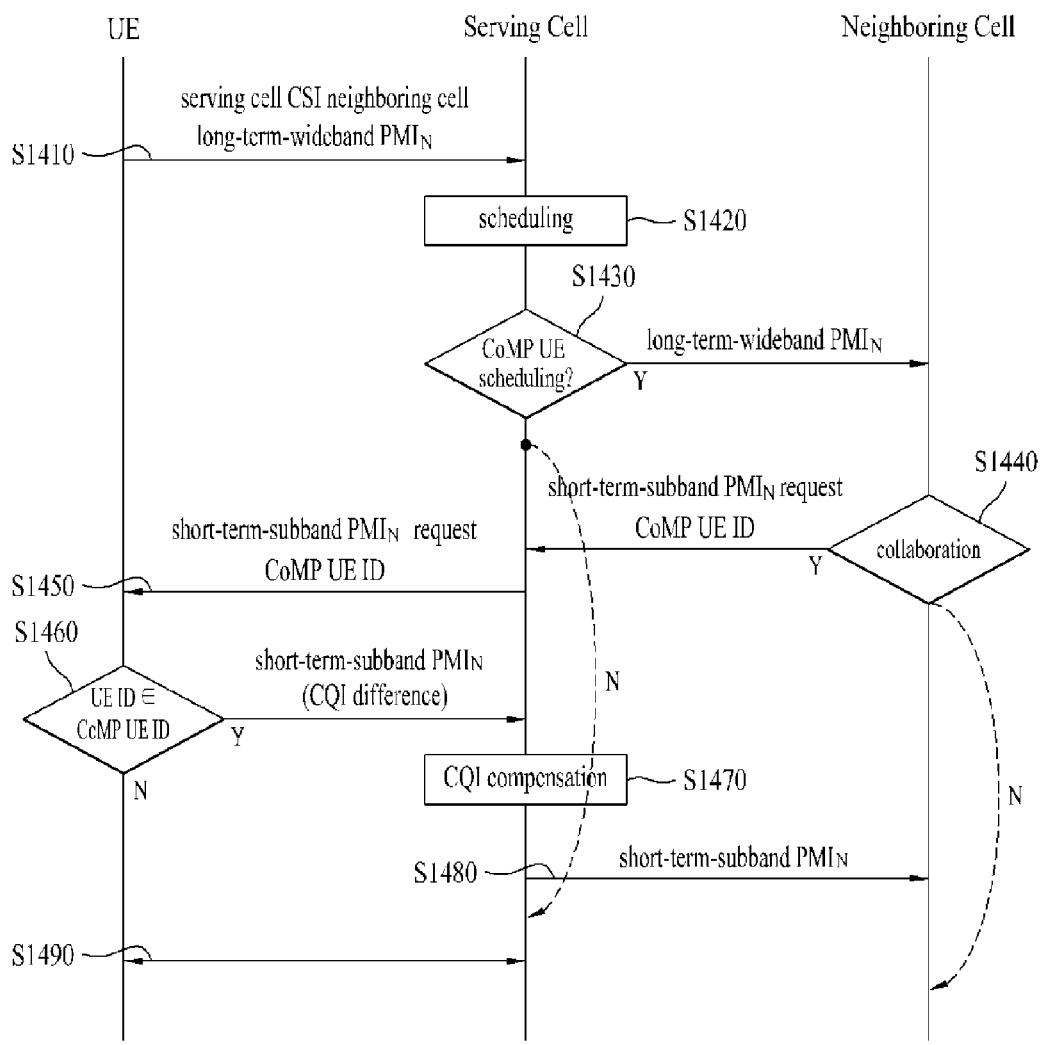
FIG. 14 is a flowchart illustrating a method for transmitting and receiving multi-cell channel state information for a CoMP operation according to an embodiment of the present invention.

FIG. 14 is a flowchart illustrating a feedback method for a UE for a CoMP operation according to an embodiment of the present invention.

In step s1410, a UE may transmit a CSI regarding a serving cell and a $PMI_N$ a neighboring cell to the serving cell. Here, the CSI regarding the serving cell may be an RI, a W1, a W2, and a CQI or may be an RI, a W1, and a CQI as in the above embodiments. In addition, the $PMI_N$ of long-term-wideband attribute regarding the neighboring cell may be a W1. The RI and CQI regarding the neighboring cell may be transmitted together with the $PMI_N$ of long-term-wideband attribute regarding the neighboring cell. In addition, the RI regarding the neighboring cell may be fixed to a specific value (for example, 1) and may be fixed to the same value as the RI regarding the serving cell.

In addition, the CSI including the long-term-wideband $PMI_N$ regarding the neighboring cell and the CSI regarding the serving cell may be transmitted at the same time or may be transmitted at different times. Each of the CSI including the long-term-wideband $PMI_N$ regarding the neighboring cell and the CSI regarding the serving cell may be transmitted through an uplink control channel or may be multiplexed into an uplink data channel to be transmitted. When the CSI is transmitted through an uplink control channel, at least one of the RI, the W1, the W2, and the CQI may be transmitted at a time point which is defined by a timing offset or a predetermined period. When the CSI is transmitted through an uplink data channel, at least one of the RI, the W1, the W2, and the CQI may be multiplexed into uplink data to be transmitted.

In step S1420, the serving cell may perform scheduling taking into consideration overall CSIs from the UE, which feeds the CSI back in step S1410, and other UEs. As a result of the scheduling process, the serving cell may decide whether or not to perform scheduling on the UE according to a CoMP scheme as shown in step S1430. Upon deciding in step S1430 to perform scheduling on the CoMP cell, the serving cell may transmit the long-term-wideband $PMI_N$ regarding a channel of the neighboring cell received from the UE in order to request the neighboring cell to perform the CoMP operation (the procedure branches to 'Y' from step S1430). On the other hand, upon deciding not to perform the CoMP operation taking into consideration the CSI feedback from the UE, the serving cell may not transmit the long-term-wideband $PMI_N$ to the neighboring cell but may instead proceed to step S1490 to continue communication with the UE (the procedure branches to 'N' from step S1430).

In step S1440, the neighboring cell may decide whether or not to collaborate with the serving cell taking into consideration a situation of the neighboring cell. Upon deciding to collaborate with the serving cell as a result of step S1440, the neighboring cell may request the CoMP UE to report a $PMI_N$ (i.e., W2) of short-term-subband attribute regarding the neighboring cell (the procedure branches to 'Y' from step S1440). Although the neighboring cell may request the $PMI_N$ of short-term-subband attribute directly from the CoMP UE when a radio channel has been established between the neighboring cell and the CoMP UE, this example shows the case in which, when a radio channel is not established between the neighboring cell and the CoMP UE, the neighboring cell transmits a request for the $PMI_N$ of short-term-subband attribute to the CoMP UE via the serving cell.

Here, when the serving cell requests the neighboring cell to perform a CoMP operation for two or more UEs, the neighboring cell may accept only the request to perform the CoMP operation for part of the UEs. In this case, the neighboring cell needs to signal the UE for which the neighboring cell accepts the CoMP operation request and to request that the UE report a $PMI_N$ of short-term-subband attribute regarding the UE. Thus, the neighboring may send a request that the UE report the $PMI_N$ of short-term-subband attribute together with an identifier (ID) of the CoMP UE.

On the other hand, when the neighboring cell has decided not to perform the CoMP operation with the serving cell in step S1440, the procedure branches to 'N' from step S1440.

In step S1450, the serving cell may transmit the CoMP UE ID and the short-term-subband $PMI_N$ request received from the neighboring cell to the CoMP UE. Here, although the serving cell may transmit the short-term-subband $PMI_N$ request only to UEs corresponding to the CoMP UE ID received from the neighboring cell, the serving may also transmit the short-term-subband $PMI_N$ request and the CoMP UE ID to all UEs served by the serving cell and each of the UEs which have received the short-term-subband $PMI_N$ request and the CoMP UE ID may perform a subsequent operation only when the UE corresponds to the CoMP UE ID. That is, a determination process of step S1460 may be performed not only by the serving cell but also by the UE. In the example shown in FIG. 14, the process of step S1460 is performed by the UE.

In step S1460, when the UE receives the short-term-subband $PMI_N$ request and determines that the received request corresponds to the UE (or when the UE receives a short-termsubband $PMI_N$ request corresponding to the UE provided by the serving cell), the UE may determine/calculate a short-term-subband $PMI_N$ for the channel of the neighboring cell and may transmit the short-term-subband $PMI_N$ to the serving cell (the procedure branches to 'Y' from step S1460).

Here, the UE may transmit a CQI difference (delta CQI) to the serving cell. The CQI difference is a difference by which a Signal-to-Noise plus Interference Ratio (SINR) is to be increased when the CoMP operation is performed. That is, when the CoMP operation is performed, the SINR will be increased as the UE receives a joint transmission from a plurality of cells and the intensity of interference that the UE will receive from the neighboring cell will be decreased as the neighboring cell performs coordinated beamforming. Therefore, the UE may report the difference by which the SINR is increased to the serving cell.

On the other hand, upon determining in step S1460 that the short-term-subband $PMI_N$ request received by the UE does not correspond to the UE, the UE may proceed to step S1490 to continue communication with the serving cell.

In step S1470, the serving cell may perform CQI compensation taking into consideration the CQI difference transmitted from the UE. For example, CQI compensation is performed by increasing the MCS level taking into consideration a level to which the SINR of a signal receives by the UE will be increased when the CoMP operation is performed.

In step S1480, the eNB may provide the short-term-subband $PMI_N$ regarding the neighboring cell received from the CoMP UE to the neighboring cell. The neighboring cell may perform scheduling for the CoMP operation using the short-term-subband $PMI_N$ regarding the neighboring cell.

The features of each of the various embodiments of the present invention described above may be independently applied or 2 or more of the various embodiments of the present invention may be simultaneously applied to the embodiment of the present invention described above with reference to FIG. 14 in which the UE transmits CSI regarding the serving cell and the neighboring cell to allow the serving cell and the neighboring cell to decide whether or not to perform the CoMP operation and redundant descriptions are omitted herein for clear explanation of the present invention.

For example, when the UE feeds CSI regarding the neighboring cell back for decision as to whether or not to perform the CoMP operation, the UE transmits CSI (for example, W1) of long-term-wideband attribute regarding the neighboring cell and does not transmit CSI of short-term-subband attribute, thereby reducing overhead. When the serving cell and the neighboring cell decide to perform the CoMP operation based on the reported long-term-wideband attribute CSI, the neighboring cell may request the CoMP UE to feed the CSI of short-term-subband attribute back and the UE may feed the CSI of short-term-subband attribute regarding the neighboring cell back at the request. Accordingly, it is possible to efficiently perform the CoMP operation while reducing CSI feedback overhead.

The description of the serving cell and the neighboring cell in the above description of FIG. 14 may be applied to an eNB and the description of at least one of the serving cell and the neighboring cell may be equally applied to a relay as a downlink transmission entity or an uplink reception entity.

Figure 15:
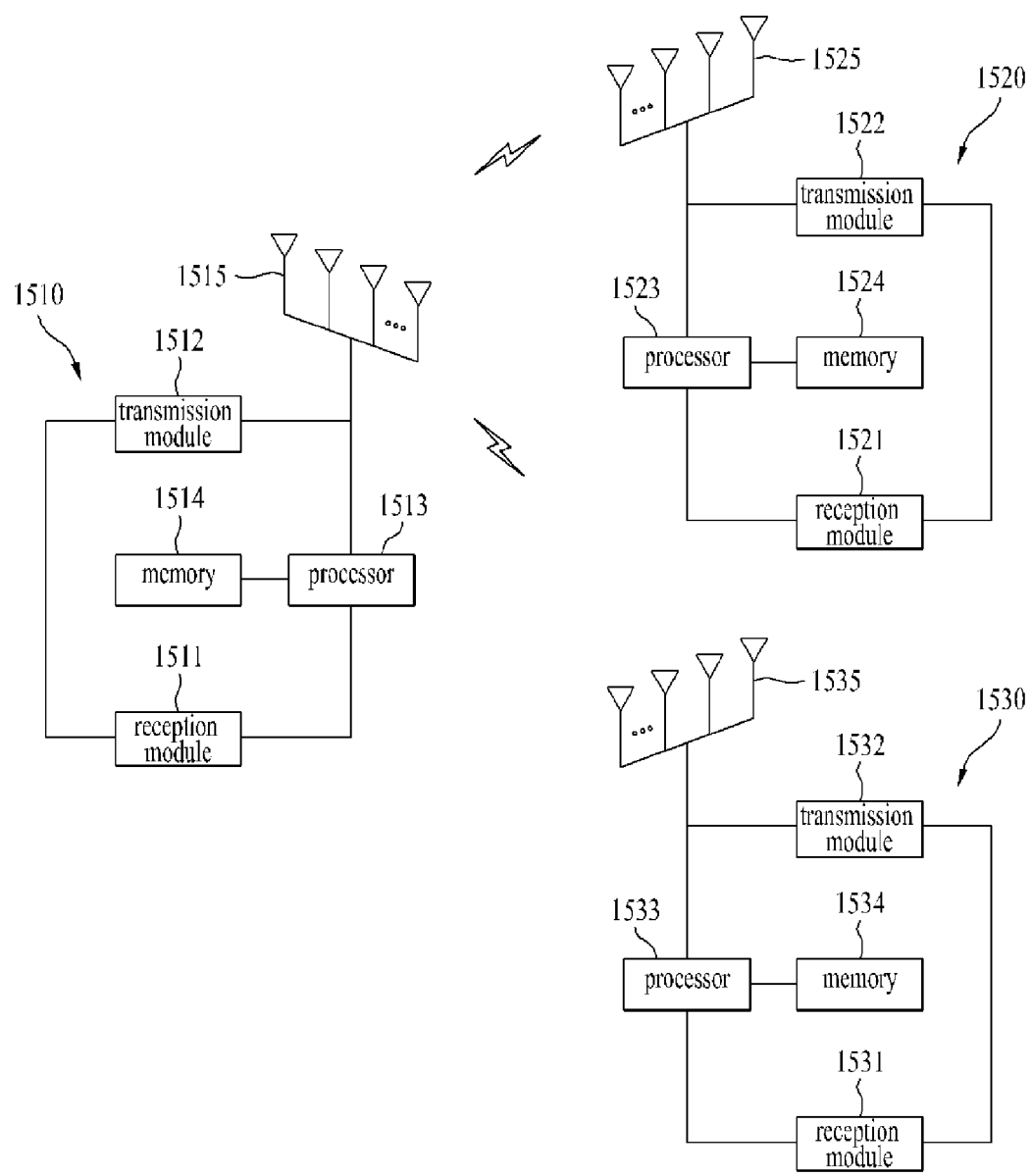
FIG. 15 illustrates a configuration of a UE and an eNB according to the present invention.

FIG. 15 illustrates a configuration of a UE and an eNB according to the present invention.

As shown in FIG. 15, a UE 1510 according to the present invention may include a reception module 1511, a transmission module 1512, a processor 1513, a memory 1514, and multiple antennas 1515. The multiple antennas 1515 indicate that the UE supports MIMO transmission and reception. The reception module 1511 may receive various downlink signals, data, and information from the eNB. The transmission module 1512 may transmit various uplink signals, data, and information to the eNB. The processor 1513 may control overall operation of the UE 1510.

The UE 1510 according to an embodiment of the present invention may be configured to transmit CSI regarding multiple eNBs. The processor 1513 of the UE may be configured to transmit CSI including a long-term-wideband PMI and a short-term-subband PMI regarding the first eNB through the transmission module 1512. The processor 1513 may also be configured to transmit CSI which includes a long-term-wideband PMI regarding the second eNB and does not include a short-term-subband PMI regarding the second eNB through the transmission module 1512. The processor 1513 may be configured to transmit CSI including a short-term-subband PMI regarding the second eNB through the transmission module 1512 upon receiving a short-term-subband PMI request regarding the second eNB through the reception module 1511.

The processor 1513 of the UE 1510 may also perform a function such as arithmetic processing on information received by the UE 1510, information to be externally transmitted, or the like and the memory 1514 may store arithmetically processed information or the like for a predetermined time and may be replaced with a component such as a buffer (not shown).

As shown in FIG. 15, the first eNB 1520 according to the present invention may include a reception module 1521, a transmission module 1522, a processor 1523, a memory 1524, and multiple antennas 1525. The multiple antennas 1525 indicate that the eNB supports MIMO transmission and reception. The reception module 1521 may receive various uplink signals, data, and information from the UE and may also receive inter-eNB information from another eNB 1530. The transmission module 1522 may transmit various downlink signals, data, and information to the UE and may also transmit various inter-eNB information to the other eNB 1530. The processor 1523 may control overall operation of the eNB 1520.

The first eNB 1520 according to an embodiment of the present invention may be configured to support CoMP communication. The processor 1523 of the first eNB may be configured to receive CSI including a long-term-wideband PMI and a short-term-subband PMI regarding the first eNB from the UE 1510 through the reception module 1521. The processor 1523 may also be configured to receive CSI which includes a long-term-wideband PMI regarding the second eNB 1530 and does not include a short-term-subband PMI regarding the second eNB from the UE 1510 through the reception module 1521. In addition, the processor 1523 may be configured to transmit CSI regarding the second eNB 1530 to the second eNB 1530 through the transmission module 1522. The processor 1523 may be configured to receive a request for a short-term-subband PMI regarding the second eNB 1530 from the second eNB 1530 through the reception module 1521 and to provide the received request to the UE 1510 through the transmission module 1522. The processor 1523 may be configured to receive CSI including a short-term-subband PMI regarding the second eNB 1530 from the UE 1510 through the reception module 1521 and to provide the received CSI to the second eNB 1530 through the transmission module 1522.

The processor 1523 of the first eNB 1520 may also perform a function such as arithmetic processing on information received by the first eNB 1520, information to be externally transmitted, or the like and the memory 1524 may store arithmetically processed information or the like for a predetermined time and may be replaced with a component such as a buffer (not shown).

As shown in FIG. 15, the second eNB 1530 according to the present invention may include a reception module 1531, a transmission module 1532, a processor 1533, a memory 1534, and multiple antennas 1535. The multiple antennas 1535 indicate that the eNB supports MIMO transmission and reception. The reception module 1531 may receive various uplink signals, data, and information from the UE and may also receive inter-eNB information from another eNB 1520. The transmission module 1532 may transmit various downlink signals, data, and information to the UE and may also transmit various inter-eNB information to the other eNB 1520. The processor 1533 may control overall operation of the eNB 1530.

The second eNB 1530 according to an embodiment of the present invention may be configured to support CoMP communication. The processor 1533 of the second eNB may be configured to receive CSI which includes a long-term-wideband PMI regarding the second eNB 1530 and does not include a short-term-subband PMI regarding the second eNB through the reception module 1531. In addition, the processor 1533 may be configured to transmit a request for a short-term-subband PMI regarding the second eNB 1530 through the transmission module 1532 upon deciding to perform CoMP communication with the first eNB 1520. The processor 1433 may be configured to receive CSI including a short-term-subband PMI regarding the second eNB 1530 through the reception module 1531.

The processor 1533 of the second eNB 1530 may also perform a function such as arithmetic processing on information received by the second eNB 1530, information to be externally transmitted, or the like and the memory 1534 may store arithmetically processed information or the like for a predetermined time and may be replaced with a component such as a buffer (not shown).

The configurations of the eNB and the UE described above may be implemented such that each of the various embodiments of the present invention described above may be independently applied or 2 or more thereof may be simultaneously applied to the eNB and the UE and redundant descriptions are omitted herein for clear explanation of the present invention.

The description of the first eNB 1520 and/or the second eNB 1530 in the above description of FIG. 14 may be equally applied to a relay as a downlink transmission entity or an uplink reception entity.

The embodiments of the present invention described above may be implemented by various means. For example, the embodiments of the present invention may be implemented by hardware, firmware, software, or any combination thereof.

In the case in which the present invention is implemented by hardware, the methods according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, or the like.

In the case in which the present invention is implemented by firmware or software, the methods according to the embodiments of the present invention may be implemented in the form of modules, processes, functions, or the like which perform the features or operations described below. Software code can be stored in a memory unit so as to be executed by a processor. The memory unit may be located inside or outside the processor and can communicate data with the processor through a variety of known means.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may combine the structures described in the above embodiments in a variety of ways. Accordingly, the invention should not be limited to the specific embodiments described herein, but should be accorded the broadest scope consistent with the principles and novel features disclosed herein.

Those skilled in the art will appreciate that the present invention may be embodied in other specific forms than those set forth herein without departing from the spirit and essential characteristics of the present invention. The above description is therefore to be construed in all aspects as illustrative and not restrictive. The scope of the invention should be determined by reasonable interpretation of the appended claims and all changes coming within the equivalency range of the invention are intended to be embraced within the scope of the invention. The invention should not be limited to the specific embodiments described herein, but should be accorded the broadest scope consistent with the principles and novel features disclosed herein. In addition, it will be apparent that claims which are not explicitly dependent on each other can be combined to provide an embodiment or new claims can be added through amendment after this application is filed.

[Industrial Applicability]

The embodiments of the present invention described above may be applied to various mobile communication systems.

The invention claimed is:

1. A method for transmitting Channel State Information (CSI) of multiple base stations from a user equipment, the method comprising:
   transmitting first CSI including long-term-wideband Precoding Matrix Information (PMI) and short-term-subband PMI regarding a serving base station; and
   transmitting second CSI which includes long-term-wideband PMI regarding a neighbor base station,
   wherein whether the second CSI includes short-term-subband PMI regarding the neighbor base station depends on whether the neighbor base station performs a Coordinated Multi-Point (CoMP) operation along with the serving base station.

2. The method according to claim 1, wherein the request for the short-term-subband PMI regarding the neighbor base station is received together with an identifier of the user equipment.

3. The method according to claim 1, further comprising:
   receiving a request for the short-term-subband PMI regarding the neighbor base station; and
   transmitting third CSI including the short-term-subband PMI regarding the neighbor base station along with a Channel Quality Information (CQI) difference indicating a change of CQI from current CQI to CQI due to the CoMP operation of the serving and the neighbor base stations.

4. The method according to claim 1, wherein when the neighbor base station performs the CoMP operation, the second CSI excludes the short-term-subband PMI regarding the neighbor base station, and wherein the short-term-subband PMI regarding the neighbor base station is transmitted solely according to a request from the serving base station.

5. The method according to claim 1, wherein the first CSI regarding the serving base station is transmitted to the serving base station and the second or the third CSI regarding the neighbor base station is transmitted to the serving base station or the neighbor base station.

6. The method according to claim 1, wherein the second CSI regarding the neighbor base station includes a Rank Indicator (RI) and the RI is fixed to 1 or is equal to a rank value regarding the serving base station.

7. A method for supporting Coordinated Multi-Point (CoMP) communication in a serving base station, the method comprising:
   receiving first Channel State Information (CSI) including long-term-wideband Precoding Matrix Information (PMI) and short-term-subband PMI regarding the serving base station and second CSI which includes long-term-wideband PMI regarding a neighbor base station from a user equipment;
   transmitting the second CSI regarding the neighbor base station to the neighbor base station;
   receiving a request for the short-term-subband PMI regarding the neighbor base station from the neighbor base station and providing the request to the user equipment; and
   receiving third CSI including the short-term-subband PMI regarding the neighbor base station from the user equipment and providing the third CSI to the neighbor base station,
   wherein whether the second CSI includes short-term-subband PMI regarding the neighbor base station depends on whether the neighbor base station performs a CoMP operation along with the serving base station.

8. The method according to claim 7, wherein:
   the request for the short-term-subband PMI regarding the neighbor base station is received together with an identifier of the user equipment, and
   the request for the short-term-subband PMI regarding the neighbor base station and the received identifier of the user equipment are provided to the user equipment.

9. The method according to claim 7, wherein a Channel Quality Information (CQI) difference indicating a change of CQI from current CQI to CQI due to the CoMP operation of the serving and neighbor base stations is received together with the third CSI including the short-term-subband PMI regarding the neighbor base station from the user equipment, and
   wherein the third CSI including the short-term-subband PMI regarding the neighbor base station from the user equipment and the CQI difference are provided to the neighbor base station.

10. The method according to claim 7, wherein when the neighbor base station performs the CoMP operation, the second CSI excludes the short-term-subband PMI regarding the neighbor base station.

11. The method according to claim 7, wherein the second CSI regarding the neighbor base station includes a Rank Indicator (RI) and the RI is fixed to 1 or is equal to a rank value regarding the serving base station.

12. A method for supporting Coordinated Multi-Point (CoMP) communication in a neighbor base station, the method comprising:
   receiving first Channel State Information (CSI) which includes long-term-wideband Precoding Matrix Information (PMI) regarding the neighbor base station;
   transmitting a request for the short-term-subband PMI regarding the neighbor base station upon determining that a CoMP operation is to be performed with a serving base station based on the CSI regarding the neighbor base station; and
   receiving second CSI including the short-term-subband PMI regarding the neighbor base station,
   wherein whether the first CSI includes short-term-subband PMI regarding the neighbor base station depends on whether the neighbor base station performs the CoMP operation along with the serving base station.

13. The method according to claim 12, wherein the third CSI regarding the neighbor base station is received from the serving base station or a user equipment that is to perform the CoMP operation.

14. The method according to claim 12, wherein the request for the short-term-subband PMI regarding the neighbor base station is transmitted together with an identifier of a user equipment that is to perform the CoMP operation.

15. The method according to claim 12, wherein when the neighbor base station performs the CoMP operation, the first CSI excludes the short-term-subband PMI regarding the neighbor base station.

16. The method according to claim 12, wherein the first CSI regarding the neighbor base station includes a Rank Indicator (RI) and the RI is fixed to 1 or is equal to a rank value regarding the serving base station.

17. A user equipment for transmitting Channel State Information (CSI) of multiple base stations, the user equipment comprising:
   a reception module for receiving a downlink signal from serving and neighbor base stations;
   a transmission module for transmitting an uplink signal to the serving and neighbor base stations; and
   a processor for controlling the user equipment including the reception module and the transmission module,
   wherein the processor is configured to transmit first CSI including long-term-wideband Precoding Matrix Information (PMI) and short-term-subband PMI regarding the serving base station through the transmission module, to transmit second CSI which includes long-term-wideband PMI regarding the neighbor base station,
   wherein whether the second CSI includes short-term-subband PMI regarding the neighbor base station depends on whether the neighbor base station performs a coordinated multi-point (CoMP) operation along with the serving base station.

18. A serving base station supporting Coordinated Multi-Point (CoMP) communication, the serving base station comprising:
   a reception module for receiving an uplink signal from a user equipment and receiving inter-base-station information from a neighbor base station;
   a transmission module for transmitting a downlink uplink signal to the user equipment and transmitting inter-base-station information to the neighbor base station; and
   a processor for controlling the serving base station including the reception module and the transmission module,
   wherein the processor is configured to receive first Channel State Information (CSI) including long-term-wideband Precoding Matrix Information (PMI) and short-term-subband PMI regarding the serving base station and second CSI which includes long-term-wideband PMI regarding the neighbor base station from the user equipment through the reception module, to transmit the second CSI regarding the neighbor base station to the neighbor base station through the transmission module, to receive a request for the short-term-subband PMI regarding the neighbor base station from the neighbor base station through the reception module and provide the request to the user equipment through the transmission module, and to receive third CSI including the short-term-subband PMI regarding the neighbor base station from the user equipment through the reception module and provide the third CSI to the neighbor base station through the transmission module, wherein whether the second CSI includes short-term-subband PMI regarding the neighbor base station depends on whether the neighbor base station performs a CoMP operation along with the serving base station.

19. A neighbor base station supporting Coordinated Multi-Point (CoMP) communication, the neighbor base station comprising:

a reception module for receiving an uplink signal from a user equipment and receiving inter-base-station information from a serving base station;

a transmission module for transmitting a downlink uplink signal to the user equipment and transmitting inter-base-station information to the serving base station; and a processor for controlling the neighbor base station including the reception module and the transmission module, wherein the processor is configured to receive first Channel State Information (CSI) which includes long-term-wideband Precoding Matrix Information (PMI) regarding the neighbor base station through the reception module, to transmit a request for the short-term-subband PMI regarding the neighbor base station upon determining that a CoMP operation is to be performed with a serving base station based on the first CSI regarding the neighbor base station through the transmission module, and to receive third CSI including the short-term-subband PMI regarding the neighbor base station through the reception module, wherein whether the first CSI includes short-term-subband PMI regarding the neighbor base station depends on whether the neighbor base station performs the CoMP operation along with the serving base station.

\* \* \* \* \*